(12) United States Patent
Higashijima et al.

(10) Patent No.: US 8,039,417 B2
(45) Date of Patent: Oct. 18, 2011

(54) CATALYST FOR POLYESTER POLYCONDENSATION AND METHOD FOR PRODUCING POLYESTER RESIN USING THE SAME

(75) Inventors: Michio Higashijima, Mie (JP); Yutaka Yatsugi, Mie (JP); Naoki Yukita, Mie (JP); Motohiro Munakata, Mie (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 12/414,891

(22) Filed: Mar. 31, 2009

(65) Prior Publication Data

US 2009/0221420 A1 Sep. 3, 2009

Related U.S. Application Data

(62) Division of application No. 11/814,454, filed as application No. PCT/JP2006/300843 on Jan. 20, 2006.

(30) Foreign Application Priority Data

Jan. 21, 2005 (JP) .................................. 2005-014379
May 13, 2005 (JP) .................................. 2005-141470
Nov. 1, 2005 (JP) .................................. 2005-318546

(51) Int. Cl.
*B01J 23/00* (2006.01)

(52) U.S. Cl. ........ 502/309; 502/150; 502/155; 502/156; 502/183; 502/242; 502/249; 528/279; 528/287

(58) Field of Classification Search .................. 528/271, 528/272, 274, 275, 279; 502/150, 155, 162, 502/183, 208, 151, 152, 153, 156, 157, 164, 502/227, 240, 242, 300, 309, 349
See application file for complete search history.

(56) References Cited

FOREIGN PATENT DOCUMENTS

| JP | 2004-124028 | 4/2004 |
|---|---|---|
| JP | 2004 217750 | 8/2004 |
| JP | 2004 224858 | 8/2004 |
| TW | 354305 | 3/1999 |

OTHER PUBLICATIONS translation of JP 2004-224858.*
Office Action issued Sep. 7, 2010, in Japanese Patent Application No. JP 2005-014379 (with English translation).
Taiwanese Office Action dated Jun. 27, 2011 issued in corresponding TW Application No. 095102221. filed Jan. 20, 2006 w/English translation.
Japanese Office Action dated Jul. 12, 2011, issued in corresponding Japanese Application No. 2005-318546, filed Nov. 1, 2005, (w/English translation) (references discussed therein already cited to the Office on Jul. 20, 2007).

* cited by examiner

*Primary Examiner* — Ling Choi
*Assistant Examiner* — Frances Tischler
(74) *Attorney, Agent, or Firm* — Oblon, Spivak, McClelland, Maier & Neustadt, L.L.P.

(57) ABSTRACT

The invention relates to a liquid catalyst solution containing a polycondensation catalyst for polyester production, which contains titanium atoms, alkaline earth metal atoms and phosphorus atoms, has high reactivity and excellent long-term storage stability, can be easily produced industrially, and has an advantage in cost.

7 Claims, 1 Drawing Sheet

CATALYST FOR POLYESTER POLYCONDENSATION AND METHOD FOR PRODUCING POLYESTER RESIN USING THE SAME

TECHNICAL FIELD

The present invention relates to a polycondensation catalyst for polyester production, a catalyst solution for polycondensation for polyester production containing the polycondensation catalyst for polyester production, a process for polyester production with the polycondensation catalyst for polyester production or the solution thereof, a polyester resin obtained by the process for polyester production, and various molded articles obtained from the polyester resin.

BACKGROUND ART

Polyester resins are extensively used in various applications including containers, e.g., bottles, films, sheets, and fibers because they have excellent chemical and physical properties.

In general, a polyester resin is produced through the esterification reaction or transesterification reaction of a dicarboxylic acid and/or an ester-forming derivative thereof with a diol and a melt polycondensation reaction. According to need, the resultant polymer is further subjected to a solid-phase polycondensation reaction especially in producing a resin for container use. For these polycondensation reactions, a compound of antimony, germanium, titanium, or the like is used as a catalyst.

However, polyester resins produced with an antimony compound as a catalyst have peculiar dullness. Because of this and because there is a fear about safety/hygiene and the environment in the use of antimony compounds, there has been a strong desire for a reduction of the amount of the antimony compound to be used or for the advent of a polycondensation catalyst usable as a substitute for the antimony compound. Polyester resins produced with a germanium compound as a catalyst are satisfactory in transparency, safety/hygiene, and the like but unavoidably have a disadvantage in cost because the germanium compound itself is exceedingly expensive. From this and other standpoints, there has been a strong desire, in the case of germanium compounds also, for a reduction in the amount of the germanium compound to be used or for the advent of a polycondensation catalyst usable as a substitute for the compound.

On the other hand, titanium compounds are attracting attention because they are inexpensive and are free from a fear about safety/hygiene, etc. Titanium compounds have come to be used in place of antimony compounds or germanium compounds. However, polyester resins produced with a titanium compound as a catalyst have peculiar yellowness and have further had quality defects such as poor thermal stability.

For overcoming such defects, patent document 1 proposes a process in which titanium, magnesium, and phosphorus compounds are separately added as respective ethylene glycol solutions in specific proportions to thereby produce a polyester resin of excellent quality. In this process, however, at least three independent catalyst addition devices are necessary and it is not easy to divert an existing polyester resin production equipment employing an antimony catalyst or the like to this process. It is therefore necessary to additionally install a new apparatus, resulting in the necessity of a further investment.

There has hence been a desire for a polycondensation catalyst for polyester production which contains titanium atoms, atoms of an alkaline earth metal such as magnesium, and phosphorus atoms in the same catalyst and which enables an existing polyester resin production equipment to be stably used as it is.

Patent document 2 discloses, as such a polycondensation catalyst for polyester production, a catalyst comprising an alkyl titanate treated with an aromatic polycarboxylic acid, a magnesium compound, a specific phosphorus compound, and ethylene glycol. However, as a result of an investigation made by the present inventors, this catalyst was found to lack long-term stability in ethylene glycol and opacify in several days during storage to give a slurry containing a precipitate of a metal ingredient. Since this catalyst is in a slurry form, the catalyst was found to have problems concerning poor handleability. For example, it is difficult to add the catalyst with satisfactory precision during a polycondensation reaction for polyester production, and the catalyst in a slurry form sediments in a catalyst storage tank or catalyst addition line and scales. Furthermore, there has been a problem that since it is essential to treat a titanium compound with an aromatic polycarboxylic acid for preparing the catalyst, this makes the production steps complicated and more costly. In addition, this process necessitates a heating step for heating to 100° C. or higher and, hence, is not easy to practice.

Patent document 3 discloses a homogeneous-solution catalyst comprising ethylene glycol or the like and, contained therein, titanium atoms and atoms of a Group 2A metal of the periodic table. In patent document 3, it is disclosed to add an organic acid or inorganic acid to the solution to make the solution acidic for the purpose of keeping the turbidity of this homogeneous-solution catalyst stably low. However, there is no statement in this patent document concerning a technique in which the phosphorus compound to be added in a polyester resin production reaction is added to the homogeneous solution. In the process proposed, it is necessary in polyester resin production to separately add the phosphorus compound as a stabilizer for the polyester resin.

In the processes according to patent documents 1 and 3, a solution containing titanium element, magnesium element, and phosphorus element is added in two or three portions. However, in the case of employing portion-wise addition in industrial production, it is necessary to strictly control an addition method and the like in order to enable the polycondensation catalyst components to be present in the reaction system in given concentrations from the standpoints of productivity or stability of the performance and product quality of the polyester to be obtained, etc.

Patent document 4 discloses a process employing as a catalyst an ethylene glycol solution containing titanium atoms and magnesium atoms which has been obtained using, as a raw material, a titanium compound synthesized beforehand which is a solid titanium compound or a solid titanium compound containing magnesium. However, this technique has a problem that the catalyst production steps are complicated partly because of the necessity of a step in which a metal compound is hydrolyzed and that the product is costly accordingly. Furthermore, there is no statement in this patent document concerning a technique in which the phosphorus compound to be added in a polyester production reaction is added to this ethylene glycol solution, and it is necessary to separately add the phosphorus compound during polyester production.

For overcoming such drawbacks, patent document 5 proposes: a liquid polycondensation catalyst for polyester production which contains titanium atoms, alkaline earth metal atoms, and phosphorus atoms, can be easily produced industrially, is less expensive, and has excellent long-term storage stability; and a process for producing the catalyst. However, the liquid catalyst of this invention contains titanium atoms in a relatively low concentration and is hence bulky. Because of this and because the catalyst contains a solvent in a large amount, the liquid catalyst proposed is unsuitable for conveyance/transport.

Patent Document 1: JP-A-2004-124068
Patent Document 2: JP-A-2004-224858
Patent Document 3: JP-A-2004-292803
Patent Document 4: JP-A-2004-176033
Patent Document 5: Japanese Patent Application No. 2005-014379

DISCLOSURE OF THE INVENTION

Problems that the Invention is to Solve

An object of the invention, which eliminates those problems of prior-art techniques, is to provide: a solid or liquid polycondensation catalyst for polyester production which contains titanium atoms, alkaline earth metal atoms, and phosphorus atoms, contains catalytically active ingredients in a high concentration, has excellent long-term storage stability, can be easily produced industrially, and has an advantage in cost; a polyester resin produced with this catalyst and excellent in quality, e.g., hue; a process for producing the polyester resin; and various molded articles.

The invention further provides: a liquid polycondensation catalyst for polyester production which is free from the problem concerning portion-wise addition in polyester production employing a titanium compound, an alkaline earth metal compound, and a phosphorus compound and which has excellent long-term storability and excellent reactivity, and gives a polyester having a satisfactory color tone; and a process for producing this catalyst. The invention furthermore provides a process for producing a polyester resin with the polycondensation catalyst.

Means for Solving the Problems (1) A polycondensation catalyst for polyester production which is a polymerization catalyst for polyester production comprising titanium atoms, alkaline earth metal atoms, phosphorus atoms, and carbon atoms, wherein at least: part of the carbon atoms are derived from an organic acid and/or a carboxylato, the content of the titanium atoms T (on weight basis) is 4-20% by weight, and the content of the organic acid and/or carboxylato L (on mole basis), the content of the alkaline earth metal atoms M (on mole basis), the content of the titanium atoms T (on weight basis), the content of the phosphorus atoms P (on mole basis), and the content of the carbon atoms C (on weight basis) satisfy the following expressions (1), (2), and (3). (First Embodiment)

$$0.8 \leq L/M \text{(molar ratio)} \leq 1.8 \quad (1)$$

$$0.05 \leq T/C \text{(weight ratio)} \leq 0.50 \quad (2)$$

$$0.5 \leq M/P \text{(molar ratio)} \leq 3.0 \quad (3)$$

(2) The polycondensation catalyst for polyester production as described under (1) above which is obtained by mixing an alcohol, a titanium compound, an alkaline earth metal compound and an acid phosphoric ester compound, and concentrating the mixture.

(3) The polycondensation catalyst for polyester production as described under (2) above wherein the ratio of the weight $W_1$ of the polycondensation catalyst for polyester production to the total weight $W_0$ of the titanium compound, alkaline earth metal compound, and acid phosphoric ester compound mixed, i.e., $W_1/W_0$, is from 0.45 to 0.85.

(4) The polycondensation catalyst for polyester production as described under (2) or (3) above wherein the alkaline earth metal compound is an organic acid salt of an alkaline earth metal and/or a hydrate of the salt.

(5) The polycondensation catalyst for polyester production as described under any one of (1) to (4) above which contains a basic structure represented by the following general formula (III).

[Ka-1]

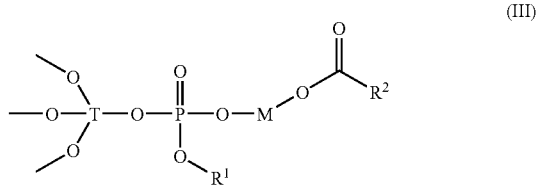

(III)

(In the formula, T is a titanium atom, M is an alkaline earth metal atom, O is an oxygen atom, P is a phosphorus atom, $R^1$ is an alkyl group having 1-6 carbon atoms, a cyclohexyl group, an aryl group, or a 2-hydroxyethyl group, and $R^2$ is an alkyl group having 1-3 carbon atoms.)

(6) The polycondensation catalyst for polyester production as described under any one of (1) to (5) above which is solid.

(7) A liquid catalyst solution for polycondensation for polyester production, which comprises: the polycondensation catalyst for polyester production as described under any one of (1) to (6) above; and ethylene glycol and/or 1,4-butanediol.

(8) The catalyst solution for polycondensation for polyester production as described under (7) above, which comprises: the polycondensation catalyst for polyester production as described under any one of (1) to (6) above; water; and ethylene glycol and/or 1,4-butanediol, has a water content of 0.01-10% by weight and a titanium atom content (on weight basis) of 300-100,000 ppm, and is liquid.

(9) The catalyst solution for polycondensation for polyester production as described under (7) or (8) above, which is obtained by: mixing ethylene glycol and/or 1,4-butandiol with a liquid material obtained by mixing an alcohol, a titanium compound, an alkaline earth metal compound and an acid phosphoric ester compound, and concentrating the mixture; and then subjecting the resultant mixture to a step in which substances having a lower boiling point than the ethylene glycol and/or 1,4-butanediol are distilled off.

(10) A liquid polycondensation catalyst for polyester production, which is obtained by mixing an alcohol, an alkaline earth metal compound and an acid phosphoric ester compound beforehand, and further mixing a titanium compound with the resultant liquid mixture. (Second Embodiment)

(11) The polycondensation catalyst for polyester production as described under (10) above wherein the alcohol is an alkylene glycol.

(12) The polycondensation catalyst for polyester production as described under (10) or (11) above wherein the titanium content in terms of titanium atom content is in the range of 0.01-2% by weight, and the molar ratio of the alkaline earth metal (M) to phosphorus and the molar ratio of titanium to phosphorus satisfy the following expressions (1) and (2), respectively:

$$0.1 \leq M/P \leq 3 \quad (1)$$

$$0.1 \leq Ti/P \leq 5 \quad (2)$$

(wherein Ti, Mg, and P each represent the contents (on mole basis) of titanium, the alkaline earth metal, and phosphorus in the polycondensation catalyst for polyester production).

(13) The polycondensation catalyst for polyester production as described under any one of (10) to (12) above which contains water in an amount of 0.01-10% by weight.

(14) The polycondensation catalyst for polyester production as described under any one of (10) to (13) above wherein the alkaline earth metal compound is a magnesium compound.

(15) The polycondensation catalyst for polyester production as described under (14) above wherein the magnesium compound is the magnesium salt of an organic acid, or a hydrate of the salt.

(16) The polycondensation catalyst for polyester production as described under any one of (10) to (15) above wherein the titanium compound is a tetraalkyl titanate.

(17) A process for producing a liquid polycondensation catalyst for polyester production containing titanium, an alkaline earth metal, and phosphorus, which comprises:

(i) a step of mixing an alcohol, an alkaline earth metal compound and an acid phosphoric ester compound beforehand; and (ii) a step of further mixing a titanium compound with the mixture solution obtained in the step (i).

(18) A process for producing a polyester resin, which comprises using the polycondensation catalyst for polyester production as described under any one of (1) to (6) above and (10) to (16) above and/or the catalyst solution for polycondensation for polyester production as described under any one of (7) to (9) above.

(19) A polyester resin obtained by the process for polyester resin production as described under (18) above.

(20) A preformed object for a hollow molded article, a hollow molded article, a film, a fiber, or a preform for a hollow molded article, which each is obtained from the polyester resin as described under (19) above.

Advantages of the Invention

According to the invention, a solid or liquid polycondensation catalyst for polyester production is provided which contains none of compounds of antimony, germanium, or the like, contains titanium atoms, alkaline earth metal atoms, and phosphorus atoms, contains catalytically active ingredients in high concentrations, has excellent long-term storage stability, can be easily produced industrially, and has an advantage in cost. With this polycondensation catalyst for polyester production, a polyester resin excellent in quality, e.g., color tone, can be industrially advantageously produced.

Furthermore, according to the invention, the problem concerning portion-wise addition in polyester production employing a titanium compound, an alkaline earth metal compound, and a phosphorus compound can be eliminated. The liquid polycondensation catalyst for polyester production of the invention is free from problems such as, e.g., the precipitation of a catalyst component during long-term storage, has excellent long-term storage stability and excellent reactivity, and can provide a polyester resin excellent in quality, e.g., color tone.

The preform obtained from the polyester resin of the invention changes little in crystallization temperature Tc1 upon moisture absorption. The range of preform temperatures for obtaining transparent bottles can be widened and stable production is possible.

BEST MODE FOR CARRYING OUT THE INVENTION

Figure 1:
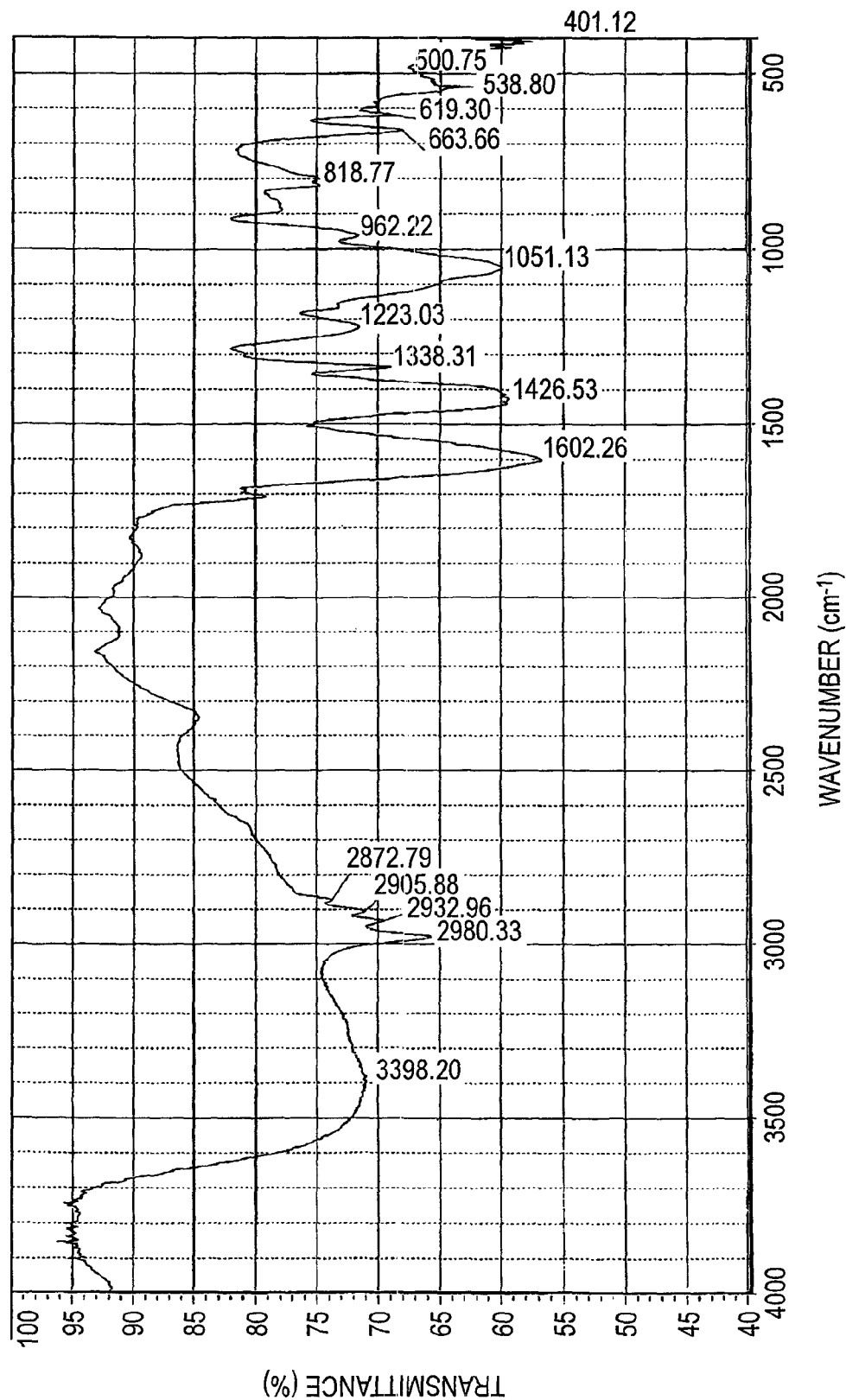
FIG. 1 is an IR analysis chart for the polycondensation catalyst produced in Example 1.

Embodiments of the invention will be explained below in detail. However, the following explanations on constituent elements are explanations for typical embodiments of the invention, and the invention should not be construed as being limited to the contents of the explanations unless the invention departs from the spirit thereof.

In this description, "ppm" and "%" always mean "ppm by weight" and "% by weight", unless otherwise indicated, e.g., with "by mole".

<Polycondensation Catalyst for Polyester Production (First Embodiment)>

The polycondensation catalyst for polyester production of the invention is a solid or liquid material which comprises titanium atoms, alkaline earth metal atoms, phosphorus atoms, and carbon atoms, wherein at least: part of the carbon atoms are derived from an organic acid and/or a carboxylato, the content of the titanium atoms T (on weight basis) is 4-20% by weight, and the content of the organic acid and/or carboxylato L (on mole basis), the content of the alkaline earth metal atoms M (on mole basis), the content of the titanium atoms T (on weight basis), the content of the carbon atoms C (on weight basis), and the content of the phosphorus atoms P (on mole basis) satisfy the following expressions (1), (2), and (3).

$$0.8 \leq L/M(\text{molar ratio}) \leq 1.8 \quad (1)$$

$$0.05 \leq T/C(\text{weight ratio}) \leq 0.50 \quad (2)$$

$$0.5 \leq M/P(\text{molar ratio}) \leq 3.0 \quad (3)$$

Examples of the organic acid and/or carboxylato which constitutes at least part of the carbon atoms contained in the polycondensation catalyst of the invention include aliphatic carboxylic acids and aliphatic carboxylatos. Preferred of these are aliphatic carboxylic acids having 1-4 carbon atoms and aliphatic carboxylatos having 1-4 carbon atoms. In particular, acetic acid ($CH_3COOH$) and acetato ($CH_3COO^-$) are especially preferred because they enable the catalyst to have excellent solubility in glycols, such as ethylene glycol and 1,4-butanediol, to be used as raw materials for a polyester resin.

In case where the content of titanium atoms T (on weight basis) in the polycondensation catalyst of the invention is lower than the lower limit, the polycondensation reaction rate in a polycondensation reaction tends to decrease. There are hence cases where an industrially sufficient rate of polycondensation reaction cannot be obtained. In case where the content thereof exceeds the upper limit, the polyester resin obtained tends to have an impaired color tone and reduced thermal stability although the rate of polycondensation reaction is sufficient. The content of the titanium atoms T in the polycondensation catalyst is preferably 4.5% by weight or higher, more preferably 5.5% by weight or higher, and is preferably 16% by weight or lower, more preferably 14% by weight or lower.

In case where L/M in expression (1) exceeds the upper limit, this leads to a decrease in catalytic activity. In case where L/M is smaller than the lower limit, the catalyst has reduced solubility in glycols to be used as raw materials for a polyester resin and this is inconvenient in practical use. The upper limit of L/M is preferably 1.7, more preferably 1.6, and the lower limit thereof is preferably 0.8, more preferably 1.0.

In case where T/C in expression (2) is either larger than the upper limit or smaller than the lower limit, the catalyst has reduced solubility in glycols, such as ethylene glycol and 1,4-butanediol, to be used as raw materials for a polyester resin and this is inconvenient in practical use. The upper limit of T/C is preferably 0.40, more preferably 0.30, and the lower limit thereof is preferably 0.15, more preferably 0.20.

In expression (3), values of M/P exceeding the upper limit are undesirable because this leads to deterioration in the thermal stability of the polyester resin obtained with this catalyst. Furthermore, there are cases where the catalyst has impaired stability in glycols to be used as raw materials for a polyester resin, resulting in precipitation of the alkaline earth metal. In case where M/P is smaller than the lower limit, catalytic activity is low. The upper limit of M/P is preferably 1.8, more preferably 1.5, and the lower limit thereof is preferably 0.9, more preferably 1.1.

<Process for Producing Polycondensation Catalyst for Polyester Production>

Next, a process for producing the polycondensation catalyst for polyester production of the invention is explained.

The polycondensation catalyst of the invention can be produced preferably by mixing an alcohol, a titanium compound, an alkaline earth metal compound, and an acid phosphoric ester compound and concentrating the mixture. More specifically, the catalyst may be produced through: (i) a step in which an alcohol, a titanium compound, an alkaline earth metal compound, and an acid phosphoric ester compound are mixed, dissolved, and reacted and (ii) a step in which the alcohol and other substances are removed by distillation from the reaction mixture solution obtained in step (i) to thereby conduct concentration and simultaneously further conduct a reaction, whereby a viscous liquid catalyst, a solid catalyst, or a mixture of these is obtained. It is thought that the alcohol used does not: participate in the reaction but serves only as a mere solvent.

In this process, that the catalyst obtained has any of different forms, i.e., a viscous liquid catalyst, a solid catalyst, or a mixture of these, depends on the degree of concentration. The catalyst obtained in step (ii) can be easily recovered as it is or after having been dissolved in, e.g., a glycol such as ethylene glycol or 1,4-butanediol. The substances to be distilled off during the concentration include the alcohol used as a solvent and the alcohol, organic acid, etc. generated as by-products by the reaction of the titanium compound, alkaline earth metal compound, and acid phosphoric ester compound.

Consequently, the polycondensation catalyst for polyester production obtained by the invention always has a smaller weight than the total weight of the raw materials excluding the alcohol used as a solvent. The ratio of the weight of the polycondensation catalyst for polyester production obtained W1 to the total weight of the titanium compound, alkaline earth metal compound, and acid phosphoric ester compound W0 mixed with the alcohol in step (i), i.e., the ratio W1/W0, is generally from 0.45 to 0.85. This ratio varies depending on the kinds of the raw-material compounds used and the proportion among these.

The alcohol to be used for producing the polycondensation catalyst of the invention may be any alcohol which, when mixed with the titanium compound, alkaline earth metal compound, and acid phosphoric ester compound, gives a homogeneous solution. Preferred of such alcohols from the standpoints of compound solubility and handleability are monohydric alcohols such as methanol, ethanol, butanol, propanol, and 2-ethylhexanol. These alcohols may be used alone or in combination of two or more thereof. In particular, ethanol is preferred because the solubility therein of the titanium compound, alkaline earth metal compound, and acid phosphoric ester compound is high and ethanol is easy to remove in the concentration of the reaction mixture solution due to its low boiling point.

Examples of the titanium compound include tetraalkoxy titanates such as tetra-n-propyl titanate, tetraisopropyl titanate, tetra-n-butyl titanate, tetra-n-butyl titanate tetramer, tetra-t-butyl titanate, and acetyltriisopropyl titanate and titanium acetate. Preferred of these are tetraisopropyl titanate and tetra-n-butyl titanate. Especially preferred is tetra-n-butyltitanate. These titanium compound may be used alone or in combination of two or more thereof.

The alkaline earth metal compound to be used preferably is an organic acid salt of an alkaline earth metal and/or a hydrate of the salt. Especially preferred examples of such compounds include organic acid salts of magnesium or calcium and/or hydrates thereof. However, the magnesium compounds are preferred from the standpoint of catalytic activity. Examples of the magnesium compounds include organic acid salts such as magnesium acetate and magnesium butyrate. However, magnesium acetate and/or a hydrate thereof is especially preferred because they have high solubility in the alcohol and catalyst preparation is easy. Those alkaline earth metal compounds may be used alone or in combination of two or more thereof. It is also possible to use a combination of compounds of different metals, such as a combination of a magnesium compound and a calcium compound.

The acid phosphoric ester compound to be used preferably is one or more compounds which have a phosphoric ester structure having at least one hydroxyl group and are represented by the following general formula (I) and/or (II).

[Ka-2]

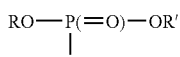

(I)

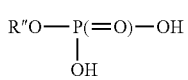

(II)

(In the formulae, R, R', and R" each represent an alkyl group having 1-6 carbon atoms, a cycloalkyl group, an aryl group, or a 2-hydroxyethyl group. In formula (I), R and R' may be the same or different.)

Examples of the acid phosphoric ester compound include methyl acid phosphate, ethyl acid phosphate, isopropyl acid phosphate, butyl acid phosphate, and octyl acid phosphate. Preferred of these are ethyl acid phosphate and butyl acid phosphate. These acid phosphoric ester compounds may be used alone or in combination of two or more thereof.

Although an acid phosphoric ester compound can be a monoester (II) or a diester (I), it is preferred to use either the monoester or a monoester/diester mixture in which the monoester content is 30% by weight or higher. In this mixture, the proportion of the monoester is more preferably 40% by weight or higher. Preferred examples of the monoester are the monoethyl ester and the monobutyl ester.

Besides a monoester (II) and a diester (I), orthophosphoric acid may be contained as an impurity in an amount of 5-20% by weight.

The process for producing the polycondensation catalyst for polyester production of the invention will be explained below in more detail using as an example the case in which ethanol is used as the alcohol serving as a solvent and tetra-n-butyl titanate, magnesium acetate tetrahydrate, and ethyl acid phosphate (weight proportion of monoester to diester, 1:1.22) are used as the titanium compound, magnesium compound, and acid phosphoric ester compound, respectively, serving as raw-material compounds.

In step (i), ethanol and the raw-material compounds are introduced into a reaction vessel having a feed opening and equipped with a stirrer, etc., and the ingredients are mixed with stirring and reacted. The reaction is conducted under mild conditions. For example, the mixture is reacted at 10-80° C., preferably 20-50° C., and ordinary pressure for 5-60 minutes to convert it into a homogeneous transparent liquid (step (i)). After the liquid reaction mixture is visually ascertained to have become transparent, the solvent and other substances are distilled off under reduced pressure to concentrate the liquid reaction mixture (step (ii)). The concentration is usually conducted at a temperature of 150° C. or lower with a general distillation apparatus, evaporator, conical dryer, spray dryer, centrifugal thin-film concentrator, Klux dryer, or the like. It is conducted at a temperature of preferably 120° C. or lower, especially preferably 100° C. or lower. In the case where the concentration is conducted to not a high degree but such a degree as to obtain a viscous liquid, this concentration can be carried out with the reactor used in step (i) to which a pressure-reducing device equipped with a distillation tube has been added. In this case, the production apparatus can be simplified.

In an initial stage in the concentration step (ii), the alcohol which has served as a solvent is mainly removed by distillation. In a later stage in the concentration, the acetic acid and water which are derived from the magnesium acetate and the butanol derived from the tetra-n-butyl titanate are removed by distillation. At the time when 90% or more of the alcohol which served as a solvent has been removed by distillation, the reaction mixture in this stage is a viscous liquid. Subsequently, as the concentration proceeds, this viscous-liquid catalyst gradually becomes a mixture of a thick liquid substance and a solid (powdery) catalyst formed on the surface thereof. With the further progress of concentration, the mixture becomes a solid catalyst.

The solid catalyst obtained through the concentration step generally has undergone a reduction in mass of 30-50% by weight based on the total weight of the raw-material compounds mixed. (Namely, the $W_1/W_0$ as described above is from 0.5 to 0.7. Hereinafter, the proportion of the weight reduction for the polycondensation catalyst obtained to the total weight of the raw-material compounds mixed is often referred to as "degree of weight reduction in production".)

This solid catalyst mainly contains 1-20% by weight butanol and further contains acetic acid (acetato) coordinated to the magnesium in an amount of 0.8-1.5 mol per mol of the magnesium metal. The solid catalyst which has been thus concentrated to a high degree has exceedingly advantageous properties concerning transportability and storability.

The solid catalyst obtained can be handled in air and does not have the property of adhering to the reactor or glass products. It is soluble in water and, hence, the reactor can be extremely easily washed with water.

It is preferred that this catalyst be stored in a sealed container. It is especially preferred that the catalyst be stored in a sealed container at room temperature after the atmosphere in the container is replaced with an inert gas, e.g., nitrogen. As long as the catalyst is placed in such an inert gas atmosphere, it can be stored for 1 year or longer.

The polycondensation catalyst of the invention can be handled also as the viscous liquid, which is the state before the isolation of the solid catalyst. This viscous liquid as it is can be used as a polycondensation catalyst. This viscous liquid catalyst has undergone a weight reduction of 20-10% by weight during production.

For the purpose of reducing the viscosity of such a viscous liquid to facilitate the handling thereof, the polycondensation catalyst of the invention may be dissolved in and diluted with a glycol to be used as a raw material for a polyester resin, such as, e.g., ethyleneglycol. The resultant catalyst solution can be stably stored for long without generating a precipitate, etc.

After the polycondensation catalyst in such a viscous liquid state has been diluted with a glycol, e.g., ethylene glycol, usable as a raw material for a polyester resin, the concentration of titanium atoms is generally 10,000-100,000 ppm by weight, preferably 20,000-50,000 ppm by weight. Such a catalyst solution can be further diluted about 10-500 times in a catalyst preparation tank before being used. By thus using the catalyst after dilution, it is possible to stably supply the low-concentration catalyst to the reaction system at a constant rate.

<Process for Producing Glycol Solution of Polycondensation Catalyst for Polyester Production>

The solid or liquid polycondensation catalyst for polyester production of the invention can be easily dissolved directly in a glycol to be used as a raw material for a polyester resin, such as, e.g., ethylene glycol and/or 1,4-butanediol (hereinafter often referred to as "glycol"), and this catalyst dilution can be industrially used.

Furthermore, a catalyst solution containing titanium, the alkaline earth metal, and phosphorus in a high concentration is produced by the steps of removing part, e.g., 70% by weight or more, preferably 85-95% by weight, of the monohydric alcohol by distillation from the liquid reaction mixture obtained in step (i) to concentrate the reaction mixture, subsequently adding a glycol thereto, and then removing low-boiling substances including the alcohol by distillation from the mixture of the alcohol, titanium compound, alkaline earth metal compound, acid phosphoric ester compound, and glycol, i.e., by replacing the solvent alcohol with a glycol. By this method, a concentrated catalyst solution in a glycol can be easily produced without via a solid catalyst.

In this case, from the standpoint of efficiently conducting the replacement of the alcohol with a glycol by distillation, the alcohol to be used preferably is one having a boiling point which differs from that of the glycol by as large as 50° C. or more. It is preferred to use an alcohol having a relatively low boiling point, such as methanol, ethanol, propanol, or butanol, among the monohydric alcohols enumerated above. These alcohols may be used alone or in combination of two or more thereof.

Also by this method in which the alcohol solvent is replaced with a glycol without via a polycondensation catalyst in a solid or viscous-liquid state, a catalyst solution having a titanium atom concentration of 10,000-100,000 ppm, preferably 20,000-50,000 ppm, can be prepared.

The high-titanium-concentration catalyst solution obtained via a polycondensation catalyst in a solid or viscous-liquid state as described above or the high-titanium-concentration catalyst solution obtained by the replacement of the alcohol solvent with a glycol as described above is excellent in storage stability and transportability and can be diluted with a glycol to be used as a raw material for a polyester resin, such as, e.g., ethylene glycol, just before use. The titanium atom concentration in the catalyst solution, at the time when the catalyst is used, may be 300-10,000 ppm, and is preferably 400-5,000 ppm, more preferably 500-3,000 ppm.

The liquid polycondensation catalyst or catalyst solution of the invention also can be handled in air. However, in the case of long-term storage for 2 or 3 months or longer, it is preferred to store the catalyst or catalyst solution in an inert gas atmosphere.

The pH of the glycol solution of the polycondensation catalyst of the invention is generally from 7 to 3, preferably from 6.5 to 4, more preferably from 6.0 to 5.0. In case where the pH thereof exceeds 7.0, there is a tendency that a metal is apt to precipitate. When the pH thereof is lower than 4.0, there are cases where the catalyst gels with the lapse of time or such a low pH leads to apparatus corrosion. Consequently, it is preferred to use a phosphorus compound showing acidity, in particular, the acid phosphoric ester compound, an aliphatic carboxylic acid, e.g., acetic acid, an alkaline earth metal compound, or the like according to need in preparing the glycol solution so as to result in a pH in that range.

When it is necessary to store the polycondensation catalyst of the invention in the form of a solution in a glycol, e.g., ethylene glycol, it is preferred that the solution should contain a small amount of water. In this case, the water content is preferably 10% by weight or lower, more preferably 5% by weight or lower, especially preferably 1.5% by weight or lower, in terms of concentration by weight based on the whole glycol solution of the polycondensation catalyst. The content thereof is preferably 0.01% by weight or higher, more preferably 0.1% by weight or higher, especially preferably 0.5% by weight or higher. In case where the water content exceeds the upper limit, there is a tendency that the titanium compound reacts with the water to cause gelation, making it difficult to obtain a homogeneous solution. In case where the water content is lower than 0.01% by weight, there is a tendency that the polycondensation catalyst solution obtained is apt to suffer precipitation and opacify during long-term storage. Water may be added in an appropriate amount to the ethylene glycol to be used in producing the catalyst solution, or may be added during and/or after the production of the catalyst solution.

The reason why the homogeneous catalyst solution, which is stable over long, is obtained by the process described above is presumed to be that the acid phosphoric ester compound is reacted with the alkaline earth metal compound and titanium compound to thereby form a ternary complex of titanium/alkaline earth metal/phosphorus and this complex is stable in the glycol solution.

The polycondensation catalyst of the invention contains a ternary complex of titanium/alkaline earth metal/phosphorus which is identified from the results of elemental analysis, infrared spectral (IR) analysis, or anion analysis. Preferably, the catalyst has at least one basic structure represented by the following general formula (III).

[Ka-3]

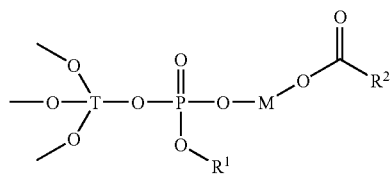

(III)

(In the formula, T is a titanium atom, M is an alkaline earth metal atom, $R^1$ is an alkyl group having 1-6 carbon atoms, a cyclohexyl group, an aryl group, or a 2-hydroxyethyl group. $R^1$ preferably is an ethyl or butyl group, which imparts excellent solubility in glycol solvents to the catalyst, and especially preferably is ethyl. $R^2$ is an alkyl group having 1-3 carbon atoms, and preferably is methyl, which imparts excellent solubility in glycol solvents to the catalyst.)

Furthermore, a polymeric structure represented by the following general formula (IV) also is a possible form in which a ternary complex of titanium/alkaline earth metal/phosphorus can be present in the polycondensation catalyst of the invention.

[Ka-4]

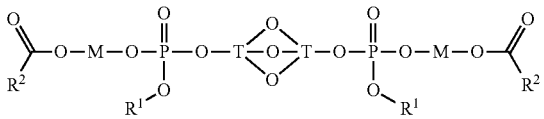

(IV)

(In the formula, T, M, $R^1$, and $R^2$ have the same meanings as in general formula (III).)

<Liquid Polycondensation Catalyst for Polyester Production (Second Embodiment) and Process for Producing the Same>

The liquid polycondensation catalyst for polyester production of the invention is one obtained by mixing at least one alcohol, at least one alkaline earth metal compound, and at least one acid phosphoric ester compound beforehand and further mixing at least one titanium compound with the resultant liquid mixture.

(Alcohol)

The alcohol to be used in the invention may be any alcohol which, when mixed with the alkaline earth metal compound, acid phosphoric ester compound, and titanium compound at ordinary temperature, gives a homogeneous transparent liquid. Of such alcohols, it is preferred to use a monohydric alcohol and/or a diol. Preferred examples of the monohydric alcohol are the alcohols having about 1-5 carbon atoms. More preferred are the alcohols having 1-3 carbon atoms. Ethanol is especially preferred. On the other hand, since polyesters are produced from dicarboxylic acids and diols as raw materials, it is preferred to use a diol, in particular, an alkylene glycol. Examples of the alkylene glycol include ethylene glycol, trimethylene glycol, tetramethylene glycol, pentamethylene glycol, hexamethylene glycol, octamethylene glycol, decamethylene glycol, neopentyl glycol, 2-ethyl-2-butyl-1,3-propanediol, polyethylene glycol, and poly(tetramethylene ether) glycol. Preferred alkylene glycols are ones for use as raw materials for polyesters. Alkylene glycols having 2-4 carbon atoms are especially preferred because they are frequently used as raw materials for polyesters.

In the case of polyester production, which will be described later, it is preferred that the alkylene glycol to be used as a raw material for the polyester to be produced should be used in producing the polycondensation catalyst of the invention. For example, in the case where the polyester to be produced is poly(ethylene terephthalate) or the like, it is preferred to use ethylene glycol.

(Alkaline Earth Metal Compound)

Examples of the alkaline earth metal compound include inorganic compounds of magnesium, calcium, and the like, such as the oxides, hydroxides, and carbonates, and organic acid salts of these metals. However, magnesium compounds are preferred from the standpoint of catalytic activity.

Examples of the magnesium compounds include inorganic compounds such as magnesium oxide, magnesium hydroxide, and magnesium carbonate, organic acid magnesium salts such as magnesium acetate, magnesium butyrate, and magnesium stearate, and magnesium alkoxides of these, magnesium acetate or a hydrate thereof is preferred because they have high solubility and facilitate the preparation of the liquid catalyst.

(Acid Phosphoric Ester Compound)

The acid phosphoric ester compound preferably is one having the following structural formula.

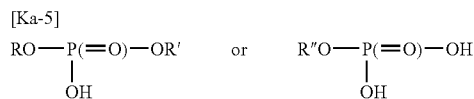

(In the formulae, R, R', and R" represent an alkyl group having carbon atoms, a cycloalkyl group, or an aryl group.)

Specific examples thereof include methyl acid phosphate, ethyl acid phosphate, isopropyl acid phosphate, butyl acid phosphate, and octyl acid phosphate. Preferred of these is ethyl acid phosphate and/or butyl acid phosphate. Although an acid phosphoric ester compound can be a monoester or a diester, it is especially preferred to use a mixture of these. In the monoester and diester, it is preferred that R, R', and R" be the same. The weight proportion of the monoester to the diester in the mixture is in the range of preferably from 80:20 to 20:80, more preferably from 30:70 to 70:30, especially preferably from 40:60 to 60:40.

(Titanium Compound)

Examples of the titanium compound include tetraalkyl titanates such as tetra-n-propyl-titanate, tetraisopropyl titanate, tetra-n-butyl titanate, tetra-n-butyl titanate tetramer, tetra-t-butyl titanate, and acetyltriisopropyl titanate, titanium acetate, titanium oxalate, and titanium chloride. Preferred of these from the standpoint of catalytic activity are tetraalkyl titanates such as tetraisopropyl titanate and tetra-n-butyl titanate and titanium oxalate. Especially preferred are the tetraalkyl titanates. Of the tetraalkyl titanates, tetra-n-butyl titanate is especially preferred.

(Mixing Proportion)

The liquid polycondensation catalyst for polyester production of the invention contains titanium, an alkaline earth metal, and phosphorus. The lower limit of the titanium content in terms of titanium atom content in the liquid catalyst is generally 0.01% by weight, preferably 0.02% by weight. The upper limit thereof is generally 2.0% by weight, preferably 1.5% by weight. In case where the titanium content is lower than the lower limit, the amount of the active ingredient in the catalyst liquid is small and this necessitates use of the catalyst liquid in a large amount. On the other hand, in case where the titanium content exceeds the upper limit, a homogeneous solution tends to be difficult to obtain.

Furthermore, the molar proportions of the titanium, alkaline earth metal (M), and phosphorus in the liquid polycondensation catalyst for polyester production of the invention are preferably in the ranges satisfying the following expressions (1) and (2).

$$0.1 \leq M/P \leq 3 \tag{1}$$

$$0.1 \leq Ti/P \leq 5 \tag{2}$$

The lower limit of Mg/P (molar ratio) is preferably 0.2, especially preferably 0.5, while the upper limit thereof is preferably 2, especially preferably 1.5. The lower limit of Ti/P (molar ratio) is preferably 0.2, especially preferably 0.3, while the upper limit thereof is preferably 3, especially preferably 1.5.

In case where M/P (molar ratio) exceeds 3, there is a tendency that the titanium compound and the alkaline earth metal compound which are mixed in step (ii), which will be described later, are apt to react with each other to form an insoluble compound. In case where M/P is below 0.1, activity in polycondensation tends to decrease.

In case where Ti/P (molar ratio) exceeds 5, an insoluble gel composition comprising titanium and phosphorus is apt to generate in the liquid catalyst. In case where Ti/P is below 0.1, catalytic activity tends to decrease.

By regulating M/P (molar ratio) and Ti/P (molar ratio) so as to be within those ranges, a liquid catalyst for polyester production excellent in long-term storage stability and reactivity can be obtained with higher certainty.

(Production)

The liquid polycondensation catalyst for polyester production of the invention can be produced by: (i) a step in which at least one alcohol, at least one alkaline earth metal compound, and at least one acid phosphoric ester compound are mixed beforehand; and (ii) a step in which at least one titanium compound is further mixed with the liquid mixture obtained in step (i).

Examples of methods for step (i) include a method in which an alcohol, e.g., an alkylene glycol, an alkaline earth metal compound, and an acid phosphoric ester compound are introduced into a preparation tank having a feed opening and equipped with a stirrer, etc., in such a proportion that the molar ratio of the alkaline earth metal to the phosphorus is in the range represented by expression (1), and are mixed with stirring. With respect to the proportion of the alcohol to be used, it is usually selected so as to yield a liquid polycondensation catalyst for polyester production of the invention in which the titanium/phosphorus molar ratio is in the range represented by expression (2) and the titanium content in terms of titanium atom content is from 0.01% by weight to 2% by weight. However, use may be made of a method in which the alcohol is used in an amount larger than the given amount and the excess alcohol is distilled off after the preparation of a liquid catalyst, as will be described later, to thereby control an ingredient concentration.

The mixing of the raw materials is conducted under mild conditions. For example, the materials are mixed at ordinary pressure and a temperature of 10-80° C., preferably 20-50° C., for 5-60 minutes, whereby a homogeneous and transparent liquid mixture is usually obtained. In step (ii), a titanium compound is added to the liquid mixture obtained in step (i), usually after the liquid mixture is visually ascertained to have become transparent, and the resultant mixture is stirred. For step (ii), the same conditions (temperature, pressure, and time) as for step (i) can be employed. Thus, a homogeneous and transparent, liquid polycondensation catalyst for polyester production can be obtained.

Furthermore, use may be made of a method which comprises preparing a polycondensation catalyst using a monohydric alcohol in steps (i) and (ii), thereafter distilling off the monohydric alcohol, and then adding an alkylene glycol to the residue to obtain a liquid polycondensation catalyst for polyester production.

The polycondensation catalyst of the invention can be produced and stored in the atmosphere or in an inert gas atmosphere, e.g., nitrogen gas. In the case of long-term storage for 2 or 3 months or longer, it is preferred to store the catalyst in an inert gas atmosphere.

As will be described later, the liquid polycondensation catalyst for polyester production of the invention preferably contains water in the amount which will be described later. However, there are cases where the water derived from a raw material used comes inevitably into the liquid catalyst. Besides such cases, use may be made of a method in which water is mixed with a raw material or water is mixed with the liquid mixture in each step.

By the process described above, a liquid polycondensation catalyst for polyester production containing titanium, an alkaline earth metal, and phosphorus can be produced in a short time period usually without the necessity of heating to a high temperature. According to need, however, the liquid catalyst for polyester production may be distilled under reduced pressure to remove unnecessary ingredients. For example, the distillation can be conducted for the removal of excess water, regulation of the concentration of each metallic element in the liquid catalyst, removal of the acetic acid generated as a by-product in the case of using magnesium acetate, removal of n-butanol in the case of using tetra-n-butyl titanate, etc.

(Liquid Polycondensation Catalyst for Polyester Production)

The pH of the liquid polycondensation catalyst for polyester production of the invention thus obtained is generally from 3 to 7, preferably from 4 to 6.5, more preferably from 5.5 to 6. In case where the pH thereof exceeds 7, there is a tendency that a metal is apt to precipitate. When the pH thereof is lower than 3, there are cases where the polycondensation catalyst alters to a gel state with the lapse of time or such low pH values lead to apparatus corrosion.

It is preferred that the liquid polycondensation catalyst for polyester production of the invention be a homogeneous transparent solution at ordinary temperature. The term "transparent" as used in the invention means that the liquid has such a degree of transparency that it can be visually recognized as transparent. The liquid catalyst preferably has a turbidity of 5% or lower when examined at an optical path length of 10 mm.

It is preferred that the liquid polycondensation catalyst for polyester production of the invention should contain a small amount of water. The water content (concentration by weight) in the whole liquid polycondensation catalyst for polyester production is preferably 10% or lower, more preferably 5% or lower, especially preferably 1.5% or lower. The water content is preferably 0.01% or higher, more preferably 0.1% or higher, especially preferably 0.5% or higher. In case where the water content exceeds the upper limit, there is a tendency that the titanium compound reacts with the water to cause gelation, making it difficult to obtain a homogeneous solution. In case where the water content is lower than 0.01%, there is a tendency that the liquid polycondensation catalyst for polyester production obtained is apt to suffer precipitation and opacify when stored for long.

The water contained may be one derived from a raw material for the catalyst (e.g., as in the case where the alkaline earth metal compound used in a hydrate). Alternatively, an appropriate amount of water may be added to an alkylene glycol to be used in catalyst production, or water may be added during or after catalyst production. Consequently, in the case where the liquid catalyst contains the water derived from a raw material for the catalyst, such as, e.g., the case where a hydrate of a magnesium compound is used, it is preferred to regulate the water concentration to a value in that range while taking account of the water from the hydrate.

The reasons why the liquid polycondensation catalyst for polyester production of the invention is a homogeneous catalyst solution which is stable over long have not been elucidated. However, the reasons are presumed to be as follows. By mixing an acid phosphoric ester compound with an alkaline earth metal compound beforehand, the two compounds are reacted to yield a relatively stable salt. Subsequently, a titanium compound is mixed with the salt, whereby a direct reaction between titanium and magnesium can be avoided and the titanium compound and the phosphorus compound retain moderate interaction. As a result, a ternary complex of titanium/alkaline earth metal/phosphorus is formed. This complex is stable in the alcohol solvent and the catalyst thus obtained is hence stable over long.

<Process for Producing Polyester Resin>

The process for polyester resin production of the invention is not particularly limited as long as any of the polycondensation catalysts for polyester production of the invention described above is used. Basically, a common process for polyester resin production can be used.

The production of poly(ethylene terephthalate) as an example of common processes for polyester resin production is shown below to explain the process for polyester resin production of the invention.

Examples of processes for producing poly(ethylene terephthalate) include a process which comprises subjecting one or more dicarboxylic acid ingredients comprising terephthalic acid or an ester-forming derivative thereof as the main component and one or more diol ingredients comprising ethylene glycol as the main component to an esterification reaction in an esterification reaction vessel or to a transesterification reaction in the presence of a transesterification catalyst, subsequently transferring the resultant low-molecular polyester which is an esterification reaction product or transesterification reaction product to a polycondensation vessel, and causing the low-molecular polyester to undergo melt polycondensation in the presence of a polycondensation catalyst and, according to need, to further undergo solid-phase polycondensation. This process may be conducted either continuously or batchwise without particular limitations.

With respect to the raw materials to be used, the proportion of the terephthalic acid or ester-forming derivative thereof in the dicarboxylic acid ingredients is preferably 90% by mole or higher, more preferably 95% by mole or higher, especially preferably 99% by mole or higher. On the other hand, the proportion of the ethylene glycol in the diol ingredients is preferably 90% by mole or higher, more preferably 95% by mole or higher, especially preferably 97% by mole or higher. In case where the proportion of the terephthalic acid or ester-forming derivative thereof in the dicarboxylic acid ingredients and the proportion of the ethylene glycol in the diol ingredients are lower than those ranges, there is a tendency that the polyester resin obtained gives a molding reduced in mechanical strength, gas barrier properties, and heat resistance.

Examples of the ester-forming derivative of terephthalic acid include alkyl esters in which the alkyl groups each have about 1-4 carbon atoms and halides. Examples of dicarboxylic acid ingredients other than terephthalic acid or ester-forming derivatives thereof include aromatic dicarboxylic acids such as phthalic acid, isophthalic acid, dibromoisophthalic acid, sodium sulfoisophthalate, phenylenedioxydicarboxylic acid, 4,4'-diphenyldicarboxylic acid, 4,4'-(diphenyl ether) dicarboxylic acid, 4,4'-(diphenyl ketone)dicarboxylic acid, 4,4'-diphenoxyethanedicarboxylic acid, 4,4'-(diphenyl sulfone)dicarboxylic acid, and 2,6-naphthalenedicarboxylic acid, alicyclic dicarboxylic acids such as hexahydroterephthalic acid and hexahydroisophthalic acid, aliphatic dicarboxylic acids such as succinic acid, glutaric acid, adipic acid, pimelic acid, suberic acid, azelaic acid, sebacic acid, undecanedicarboxylic acid, and dodecanedicarboxylic acid, alkyl esters thereof in which the alkyl groups each have about 1-4 carbon atoms, and halides of such acids. One or more of such dicarboxylic acid ingredients may be used as comonomer ingredients.

On the other hand, examples of diol ingredients other than ethylene glycol include diethylene glycol. The proportion of diethylene glycol, including one which generates as a by-product in the reaction system, in the diol ingredients is preferably 3% by mole or lower, more preferably from 1.5% by mole to 2.5% by mole. Other examples of the diol ingredients include aliphatic diols such as trimethylene glycol, tetramethylene glycol, pentamethylene glycol, hexamethylene glycol, octamethylene glycol, decamethylene glycol, neopentyl glycol, 2-ethyl-2-butyl-1,3-propanediol, polyethylene glycol, and polytetramethylene ether glycol, alicyclic diols such as 1,2-cyclohexanediol, 1,4-cyclohexanediol, 1,1-cyclohexanedimethylol, 1,4-cyclohexanedimethylol, and 2,5-norbornanedimethylol, aromatic diols such as xylene glycol, 4,41-dihydroxybiphenyl, 2,2-bis(4'-hydroxyphenyl)propane, 2,2-bis(4'-β-hydroxyethoxyphenyl)propane, bis(4-hydroxyphenyl)sulfone, and bis(4-β-hydroxyethoxyphenyl)sulfonic acid, and ethylene oxide adducts or propylene oxide adducts of 2,2-bis(4'-hydroxyphenyl)propane. One or more of such diol acid ingredients may be used as comonomer ingredients.

Furthermore, one or more of the following compounds may be used as comonomer ingredients: hydroxycarboxylic acids and alkoxycarboxylic acids, such as glycolic acid, p-hydroxybenzoic acid, and p-β-hydroxyethoxybenzoic acid; monofunctional ingredients such as stearyl alcohol, heneicosanol, octacosanol, benzyl alcohol, stearic acid, behenic acid, benzoic acid, t-butylbenzoic acid, and benzoylbenzoic acid; and polyfunctional ingredients having a functionality of 3 or higher, such as tricarballylic acid, trimellitic acid, trimesic acid, pyromellitic acid, naphthalenetetracarboxylic acid, gallic acid, trimethylolethane, trimethylolpropane, glycerol, and pentaerythritol.

In the invention, when the dicarboxylic acid ingredients comprising terephthalic acid or an ester-forming derivative thereof as the main component, the diol ingredients comprising ethylene glycol as the main component, and the comonomer ingredients which are optionally used are subjected to an esterification reaction or a transesterification reaction, then these ingredients are generally mixed in such proportions that the lower limit of the molar ratio of the diol ingredients to the dicarboxylic acid ingredients is generally 1.02, preferably 1.03, and the upper limit thereof is generally 2.0, preferably 1.7.

In the case of a transesterification reaction, it is generally necessary to employ a transesterification catalyst and to use the catalyst in a large amount. Because of this, the process in which a polyester is produced using a dicarboxylic acid as a raw material through an esterification reaction is preferred, as the process for polyester production of the invention, to a transesterification reaction.

A single esterification reaction vessel or a multistage reactor comprising esterification reaction vessels connected serially is, for example, used to conduct the esterification reaction with ethylene glycol refluxing until the degree of esterification (proportion of those carboxyl groups of the raw-material dicarboxylic acid ingredients which have been esterified through reaction with the diol ingredients to all carboxyl groups of the dicarboxylic acid ingredients) reaches generally 90% or higher, preferably 93% or higher, while removing the water generated by the reaction and the excess ethylene glycol. The low-molecular polyester obtained as a product of the esterification reaction preferably has a number-average molecular weight of 500-5,000.

Examples of reaction conditions in the esterification reaction are as follows. In the case of using a single esterification reaction vessel, a general method is one in which the reaction is conducted at a temperature of generally about 200-280° C. and a pressure of generally about 0-400 kPa (0-4 kg/cm$^2$ G) in terms of pressure relative to atmospheric pressure for a period of about 1-10 hours with stirring. In the case of using two or more esterification reaction vessels, a general method is one in which reaction conditions in the first-stage esterification reaction vessel include a lower limit of reaction temperature of generally 240° C., preferably 245° C., an upper limit thereof of generally 270° C., preferably 265° C., a lower limit of reaction pressure in terms of pressure relative to atmospheric pressure of generally 5 kPa (0.05 kg/cm$^2$ G), preferably 10 kPa (0.1 kg/cm$^2$ G), and an upper limit thereof of generally 300 kPa (3 kg/cm$^2$ G), preferably 200 kPa (2 kg/cm$^2$ G), and reaction conditions in the final stage include a lower limit of reaction temperature of generally 250° C., preferably 255° C., an upper limit thereof of generally 280° C., preferably 275° C., and a reaction pressure in terms of pressure relative to atmospheric pressure of generally 0–150 kPa (0-1.5 kg/cm$^2$ G), preferably 0-130 kPa (0-1.3 kg/cm$^2$ G).

In conducting the esterification reaction, the formation of diethylene glycol as a by-product from the ethylene glycol can be inhibited by adding beforehand to the reaction system a small amount of, e.g., a basic compound such as a tertiary amine, e.g., triethylamine, tri-n-butylamine, or benzyldimethylamine, a quaternary ammonium hydroxide, e.g., tetraethylammonium hydroxide, tetra-n-butylammonium hydroxide, or trimethylbenzylammonium hydroxide, lithium carbonate, sodium carbonate, potassium carbonate, or sodium acetate.

For the melt polycondensation of the low-molecular polyester thus obtained, use is generally made of a method in which either a single melt polycondensation vessel or a multistage reactor comprising melt: polycondensation vessels connected serially, e.g., one comprising a first-stage reaction vessel of the complete mixing type equipped with stirring blades and second-stage and third-stage reaction vessels which are of the horizontal plug-flow type equipped with stirring blades, is used to conduct the polycondensation reaction while the ethylene glycol which has generated is being removed from the system by distillation under reduced pressure.

Examples of reaction conditions in the melt polycondensation are as follows. In the case of using a single polycondensation vessel, a general method is one in which the reaction is conducted at a temperature of generally about 250-290° C. for a period of about 1-20 hours with stirring while gradually reducing the pressure from ordinary pressure finally to generally about 1.3-0.013 kPa (10-0.1 Torr) in terms of absolute pressure. In the case of using two or more polycondensation vessels, examples of methods include one in which reaction conditions in the first-stage polycondensation vessel include a lower limit of reaction temperature of generally 250° C., preferably 260° C., an upper limit thereof of generally 290° C., preferably 280° C., an upper Limit of reaction pressure in terms of absolute pressure of generally 65 kPa (500 Torr), preferably 26 kPa (200 Torr), and a lower limit thereof of generally 1.3 kPa (10 Torr), preferably 2 kPa (15 Torr), and reaction conditions in the final stage include a lower limit of reaction temperature of generally 265° C., preferably 270° C., an upper limit thereof of generally 300° C., preferably 295° C., an upper limit of reaction pressure in terms of absolute pressure of generally 1.3 kPa (10 Torr), preferably 0.65 kPa (5 Torr), and a lower limit thereof of generally 0.013 kPa (0.1 Torr), preferably 0.065 kPa (0.5 Torr). Furthermore, in the case of using an intermediate stage, examples of methods include one in which reaction conditions intermediate between the two sets of conditions shown above are selected. For example, examples of reaction conditions in the second stage in a three-stage reactor include a lower limit of reaction temperature of generally 265° C., preferably 270° C., an upper limit thereof of generally 295° C., preferably 285° C., an upper limit of reaction pressure in terms of absolute pressure of generally 6.5 kPa (50 Torr), preferably 4 kPa (30 Torr), and a lower limit thereof of generally 0.13 kPa (1 Torr), preferably 0.26 kPa (2 Torr).

Incidentally, in many processes heretofore in use, a phosphorus compound is added usually before the initiation of a polycondensation reaction. However, since the catalyst of the invention already contains a phosphorus compound (e.g., the acid phosphoric ester compound), the polycondensation reaction may be conducted without separately adding a phosphorus compound. However, the process of the invention should not be construed as excluding the addition of a phosphorus compound at all.

The addition of the polycondensation catalyst for polyester production of the invention to a reaction system may be conducted at any of the stage of mixing the dicarboxylic acid ingredients with the diol ingredients for preparation, any stage in the esterification reaction, and an initial stage in the melt polycondensation. However, from the standpoint of effectively producing the effect of the invention that a polyester resin excellent in color tone and transparency is produced at a high reaction rate, it is preferred to add the polycondensation catalyst for polyester production of the invention to a reaction system after the degree of esterification in the esterification reaction has reached 90% or higher. It is more preferred that the catalyst be added in the period from substantial completion of the esterification step to an initial stage in the melt polycondensation step, in particular, before initiation of the melt polycondensation. It is especially preferred that the catalyst be added to the final-stage esterification reaction vessel in a multistage reactor or to an esterification reaction product which is being transferred from the esterification vessel to the melt polycondensation step. Addition of the polycondensation catalyst at a stage where the degree of esterification is lower than 90% is undesirable because there are cases where the unreacted carboxylic acid deactivates the polycondensation catalyst.

The number of times of addition of the polycondensation catalyst of the invention is not particularly limited. For example, in the case of use in the batchwise polycondensation reaction, the necessary amount of the catalyst may be added at a time or the catalyst may be added in two or more portions according to need. Likewise, in the case of use in the continuous process, the necessary amount of the catalyst may be added through one part or may be separately added through two or more parts according to need.

Furthermore, the polycondensation catalyst of the invention can be added in the form of a solution in the main raw-material diol ingredient, e.g., ethylene glycol or 1,4-butanediol, for the polyester resin to be produced. The polycondensation catalyst for polyester production of the invention may be used in such a concentration that the polyester resin obtained has a titanium concentration in the range of generally 0.1-200 ppm, preferably 0.5-100 ppm, more preferably 3-50 ppm, even more preferably 4-20 ppm, in terms of titanium atom concentration.

The polyester resin obtained through the melt polycondensation has the following intrinsic viscosity ($[\eta 1]$) as a value determined through a measurement at 30° C. using a phenol/tetrachloroethane (1/1 by weight) mixture as a solvent. The lower limit of the intrinsic viscosity is generally 0.35 dL/g, preferably 0.50 dL/g, and the upper limit thereof is generally 0.75 dL/g, preferably 0.65 dL/g. When the intrinsic viscosity ($[\eta 1]$) is lower than that range, there are cases where operation becomes inefficient in the discharge from the polycondensation vessel which will be described later. On the other hand, when the intrinsic viscosity ($[\eta 1]$) exceeds that range, there are cases where the acetaldehyde content in the polyester resin obtained is difficult to reduce.

In the case where the polyester resin obtained through the melt polycondensation is to be used in other applications represented by films and fibers, the lower limit of the intrinsic viscosity ($[\eta 1]$) thereof determined in the same manner is generally 0.50 dL/g, preferably 0.55 dL/g, and the upper limit thereof is generally 0.75 dL/g, preferably 0.70 dL/g. Values of the intrinsic viscosity ($[\eta 1]$) lower than that range are undesirable because there is a tendency that mechanical strength decreases. Values thereof exceeding that range are undesirable because there are cases where moldability becomes poor.

In the case where the polyester resin is to be used for producing hollow molded articles, in particular, in bottle applications, the color tone thereof is preferably such that the value of b in the chromaticity coordinates in Hunter's color difference formula according to the Lab color system as provided for in Reference Example 1 in JIS Z8730 is preferably 4 or smaller, more preferably 3 or smaller. In case where the value of b exceeds that range, molded articles such as bottles tend to have a yellowish tone. On the other hand, in the case where titanium oxide is added as will be described later in order to use the polyester resin in other applications represented by films and fibers, in particular, to form the polyester resin into fibers, the value of b is preferably 12 or smaller, especially 10 or smaller, from the standpoint of the color tone of the fibers obtained. A so-called organic toning agent may be added in order to regulate the value of b so as to be in that range. Examples of the organic toning agent include dyes and pigments such as Solvent Blue 104, Solvent Red 135, Solvent Violet 36, Pigment Blue 29, Pigment Blue 15:1, Pigment Blue 15:3, Pigment Red 187, Pigment Red 263, and Pigment Violet 19.

In general, the polyester resin obtained through the melt polycondensation described above is discharged in a strand form through discharge orifices formed in a bottom part of the polycondensation vessel, and the strands are cut into granules, such as pellets or chips, with a cutter during or after cooling with water. It is preferred that these granules obtained through the melt polycondensation be further subjected to solid-phase polycondensation.

The solid-phase polycondensation can be conducted by a known method, e.g., the method described in JP-A-2004-292803, paragraphs [0057]-[0065].

For example, the resin granules are heated at a temperature of generally 60-180° C., preferably 150-170° C., in an inert gas atmosphere such as, e.g., nitrogen, carbon dioxide, or argon, in a water vapor atmosphere, or in an inert gas atmosphere containing water vapor to thereby crystallize the surface of the resin granules. Thereafter, the granules are heat-treated for a period of generally 50 hours or shorter at a temperature in the range of generally from just below the adhesion temperature of the resin to the temperature lower by 80° C. than the adhesion temperature, preferably from the temperature lower by 10° C. than the adhesion temperature to the temperature lower by 60° C. than it, in an inert gas atmosphere and/or at a reduced pressure of about $1.3 \times 10^1$ to $1.3 \times 10^3$ Pa in terms of absolute pressure while preventing the granules from sticking to one another by fluidization, etc., whereby solid-phase polycondensation can be conducted. By this solid-phase polycondensation, not only the polyester resin obtained can be made to have a higher degree of polymerization but also the acetaldehyde generated as a by-product, low-molecular oligomers, etc. can be diminished.

The content of terminal carboxyl groups in the polyester resin obtained through melt polycondensation and to be subjected to solid-phase polycondensation is generally from 5 eq/ton to 50 eq/ton, preferably from 10 eq/ton to 35 eq/ton. Terminal carboxyl group contents in the resin exceeding the upper limit are undesirable because there are cases where the rate of polycondensation in the solid-phase polycondensation is low and because the polyester resin obtained through the solid-phase polycondensation is susceptible to hydrolysis. Conversely, in case where the content thereof is lower than the lower limit, the rate of polycondensation in the solid-phase polycondensation tends to be low. The terminal carboxyl group content can be regulated so as to be in the desired range by regulating the molar ratio of the dicarboxylic acid ingredients to the diol ingredients in the preparation of a low-molecular polyester and changing the amount of the diol to be used for dissolving the polycondensation catalyst of the invention therein, polycondensation temperature, etc.

The resin obtained through the melt polycondensation or solid-phase polycondensation described above may be subjected to further treatments according to purposes, e.g., deactivation of the polycondensation catalyst. For example, the resin can be subjected to a treatment such as a water treatment in which the resin is immersed in water having a temperature of 40° C. or higher for 10 minutes or longer or a steam treatment in which the resin is kept in contact with water vapor or a water-vapor-containing gas each having a temperature of 60° C. or higher for 30 minutes or longer.

The polycondensation catalyst of the invention is suitable also for the production of a polyester resin containing titanium oxide as a pigment, in particular, one for fibers or the like. A process for this production is not particularly limited as long as it comprises an esterification step and a polycondensation step for condensation-polymerizing the reaction product obtained in the esterification step and the polycondensation step is conducted using titanium oxide and the polycondensation catalyst. For example, a common process for polyester production can be employed. In the polycondensation step, melt condensation is conducted and, according to need, solid-phase polycondensation may be subsequently conducted.

Titanium oxide may be added during the esterification reaction or at any time during the period from completion of the esterification reaction to initiation of the polycondensation reaction.

Methods for adding titanium oxide are not particularly limited, and use can be made of, e.g., a method in which titanium oxide is added in the original powder form or a method in which titanium oxide is added as a slurry. However, addition in a slurry form is preferred from the standpoints of ease of addition operation and suitability for the precise regulation of addition amount. The dispersion medium to be used for slurring the titanium oxide is not particularly limited. However, diols are preferred from the standpoint that diols are less apt to influence the properties of the polyester resin to be obtained. Preferred of these is ethylene glycol and/or diethylene glycol. Ethylene glycol is especially preferred from the standpoint of giving a polyester having enhanced strength.

In the case of adding titanium oxide also, an aid or stabilizer which prevents the polyester resin from deteriorating can be used. Preferred examples of the aid or stabilizer include phosphorus compounds such as phosphoric esters, e.g., trimethyl phosphate, triethyl phosphate, tri-n-butyl phosphate, trioctyl phosphate, triphenyl phosphate, and tricresyl phosphate, acid phosphoric esters such as methyl acid phosphate, ethyl acid phosphate, isopropyl acid phosphate, butyl acid phosphate, dibutyl phosphate, monobutyl phosphate, and dioctyl phosphate, phosphoric acid, phosphorous acid, and polyphosphoric acid.

The timing of addition of the aid or stabilizer preferably is during the preparation of the raw-material slurry, at any stage in the esterification step, or at an initial stage in the melt polycondensation step. The aid or stabilizer may be used in an amount in the range of generally 1-1,000 ppm, in terms of the weight of phosphorus atoms, of all raw materials to be subjected to polycondensation. However, the amount thereof is preferably in the range of 3-30 ppm from the standpoints of improvement in color tone, activity in polymerization, and improvement of the thermal stability of the polyester to be obtained.

The polyester resin produced by the production process of the invention can be molded into a hollow molded container such as a bottle, for example, by molding the resin into a preform by injection molding or extrusion molding and then subjecting the preform to stretch blow molding. The preform formed from the polyester resin of the invention has satisfactory moldability in stretch blow molding. Namely, it has the following advantage. Some preforms obtained by molding are subjected to stretch blow molding immediately after the molding, while other preforms molded are subjected to blow molding after storage for a certain period or unspecified period. In the latter case, the preforms obtained from common polyester resins for bottles absorb moisture with the lapse of storage time and come to have an increased crystallization rate (come to have a lowered temperature-rising crystallization temperature Tc1). When these preforms which have been stored are subjected to stretch blow molding, the preforms are hence apt to crystalline in the preform heating step and transparent bottles are difficult to obtain. In contrast, the preform obtained from the polyester resin of the invention is less apt to suffer a decrease in Tc1 caused by moisture absorption. Because of this, even when the preform which has been stored is subjected to stretch blow molding, the range of preform heating temperatures at which transparent bottles can be molded is wide and the stretch blow molding can be stably conducted.

Furthermore, the polyester resin of the invention, which has been produced with the polycondensation catalyst for polyester production of the invention, can be molded into a hollow molded container or dish-form vessel, for example, by molding the resin into a sheet-form preformed object by extrusion molding and then subjecting the preformed object to vacuum forming or compression vacuum forming. In particular, the preformed object has satisfactory formability in vacuum forming or compression vacuum forming. In general, sheet-form preformed objects are subjected to vacuum forming or compression vacuum forming after having been stored for a certain period or unspecified period. In the storage, however, the preformed objects obtained from polyester resins usually absorb moisture with the lapse of storage time and come to have an increased crystallization rate. Because of this, when these preformed objects which have been stored are subjected to vacuum forming or compression vacuum forming, the preformed objects are apt to crystallize in the preformed-object heating step. It has hence been difficult to obtain transparent hollow molded containers or the like. In contrast, the preformed object obtained from the polyester resin of the invention is less apt to suffer a decrease in Tc1 caused by moisture absorption. Consequently, even when the preformed object which has been stored is subjected to vacuum forming or compression vacuum forming, the range of preformed-object heating temperatures at which transparent hollow molded containers or the like can be obtained is wide and hollow molded containers or the like can be stably formed.

Besides being used for forming such preforms for hollow molded containers or for forming hollow molded containers, the polyester resin of the invention produced with the polycondensation catalyst for polyester production of the invention is useful as a molding material for various hollow molded articles, preformed objects for hollow molded articles, preforms for hollow molded articles, films, fibers, and the like. Molded articles excellent in quality, e.g., color tone, can be obtained therefrom.

EXAMPLES

The invention will be explained below in more detail by reference to Examples and Comparative Examples. However, the invention should not be construed as being limited by the following Examples unless the invention departs from the spirit thereof.

Examples A

Examples and Comparative Examples Concerning Polycondensation Catalyst Preparation Examples and Comparative Examples concerning the preparation of polycondensation catalysts are shown below.

The polycondensation catalysts or polycondensation catalyst solutions prepared in the following Examples and Comparative Examples were evaluated for storage stability and examined for pH by the following methods.

<Method of Evaluating Storage Stability of Polycondensation Catalyst or Polycondensation Catalyst Solution>

A polycondensation catalyst was evaluated in the following manner. In a 50-mL Erlenmeyer flask equipped with a ground glass stopper was placed 50 g of ethylene glycol of the special grade. The catalyst was added thereto in an amount of 0.5% by weight. The contents were vigorously agitated for hours with a stirrer bar made of Teflon. The homogeneous solution obtained was allowed to stand at room temperature (23° C.). After 2 weeks, this solution was examined for a precipitate.

With respect to a polycondensation catalyst solution, this solution, without being subjected to any treatment, was allowed to stand at room temperature (23° C.) and, after 2 weeks, examined for a precipitate.

<Method of Measuring pH of Polycondensation Catalyst or Polycondensation Catalyst Solution>

An automatic titrator (Type AUT-501) manufactured by DKK-Toa Corp. was used to measure the pH of an ethylene glycol solution of a polycondensation catalyst or the pH of a polycondensation catalyst solution. In the measurement, the pH electrode was immersed in the solution in the air.

Furthermore, a polycondensation catalyst or an ethylene glycol solution of a catalyst was analyzed to determine organic ingredients contained therein (acetic acid, acetato, butanol, ethanol, ethylene glycol monoacetate, and ethylene glycol) by the following methods.

<Analysis for Organic Ingredients other than Carboxylic Acid Ingredients>

A liquid prepared by dissolving or suspending 50 mg of the polycondensation catalyst or 500 mg of the ethylene glycol solution of a catalyst in 10 mL of methanol was used as a test sample for gas chromatography. Conditions for the analysis by gas chromatography were as follows.
Apparatus: HP6890, manufactured by Agilent
Detector conditions: 200° C., FID
Column: Agilent HP-INNOWAX; 30 m×0.25 mmΦ; film thickness, 0.5 μm
Carrier: helium, 1 mL/min
Heating conditions: Holding at 40° C. for 2 minutes after sample injection, subsequently heating to 60° C. at 5° C./min, and then heating to 220° C. at 10° C./min.
Injection hole conditions: 320° C.; split ratio, 1/50
Sample injection amount: 2 μL
Internal reference: isoamyl alcohol
<Analysis for Carboxylic Acid Ingredients>

To about 1,500 μL of heavy water were added 100 mg of a sample and 5.0 mg of dimethyl sulfoxide (DMSO) as an internal reference. After the sample and the internal reference were dissolved, a 750-μL portion of the resultant solution was transferred to a sample tube having an outer diameter of 5 mm and subjected to analysis with spectrometer AV400M, manufactured by Bruker GmbH, at room temperature and a waiting time of 20 seconds to obtain an 1H-NMR spectrum.

By this analysis, the total amount of acetato ($CH_3COO-$) coordinated to a metal and of free acetic acid ($CH_3COOH$) was determined.

<Elemental Analysis (C, H)>

Analysis for carbon and hydrogen was conducted with elemental analyzer 2400II CHN—O (CHN mode), manufactured by PerkinElmer, Inc.

<Analysis of Catalyst for Metallic Elements>

In a Kjeldahl flask, 0.1 g of a polycondensation catalyst or 0.2 g of an ethylene glycol solution of a catalyst was subjected to wet decomposition with hydrogen peroxide in the presence of sulfuric acid. Thereafter, the resultant mixture was diluted with distilled water to adjust the total volume to a given value and then subjected to quantitative analysis with a plasma emission spectrophotometer (ICP-AES ULtrace Type JY-138U, manufactured by JOBINYVON). The found values were converted to metal contents (% by weight) in the catalyst.

<IR Examination>

FT710, manufactured by Nicolet, was used for the examination, in which 25 mg of a catalyst sample was diluted with 100 mg of a diamond powder and this mixture was packed into a cell and examined.

Example 1

Preparation of Polycondensation Catalyst (Polycondensation Catalyst A)

Into a 500-mL eggplant type flask made of glass and equipped with a stirrer was introduced 139.8 g of magnesium acetate tetrahydrate, followed by 250 g of absolute ethanol (purity, 99% or higher). Furthermore, 71.6 g of ethyl acid phosphate (weight proportion of the monoester to the diester, 1:1.22) was added. The resultant mixture was stirred at 23° C. After 15 minutes, the magnesium acetate was ascertained to have dissolved completely. Thereafter, 75.0 g of tetra-n-butyl titanate was added thereto. The mixture was continuously stirred for further 10 minutes to obtain a homogeneous mixture solution. This mixture solution was transferred to a 1-L eggplant type flask and concentrated under reduced pressure with an evaporator on a 60° C. oil bath. At about 1 hour after initiation of the concentration, the ethanol had been mostly distilled off and a translucent viscous liquid remained. The temperature of the oil bath was elevated to 80° C. and the concentration was further conducted at a reduced pressure of 5 Torr. The viscous liquid gradually changed into a powder from the surface and completely changed into a powder in about 2 hours. Thereafter, the pressure was returned to ordinary pressure with nitrogen, and the contents were cooled to room temperature. Thus, 183 g of a white powder (referred to as polycondensation catalyst A) was obtained. The catalyst obtained was found to have undergone a degree of weight reduction in production of 36% based on the total weight of all raw materials excluding the ethanol solvent.

Found values: Ti, 6.0; Mg, 8.8; P, 9.0; C, 26.5; H, 6.3 (% by weight)

IR (cm$^{-1}$): 3500 (ν OH), 2980 (ν CH), 1400-1600 (ν C=O) 1050 (ν C—O)

An IR analysis chart is shown in FIG. 1.

The value of L/M was calculated from the found value of the amount of acetato (on mole basis) contained in the catalyst and the found value of magnesium content (on mole basis), and the value of T/C was calculated from the found values of carbon content (on weight basis) and titanium content (on weight basis). As a result, the values of L/M (molar ratio) and T/C (weight ratio) were found to be 1.3 and 0.23, respectively.

This catalyst showed satisfactory storage stability in ethylene glycol, and no precipitate formation was observed. The pH thereof was 6.2.

Example 2

Preparation of Polycondensation Catalyst (Polycondensation Catalyst B)

Synthesis was conducted in the same manner as in Example 1, except that the amounts of the magnesium acetate tetrahydrate and the ethyl acid phosphate were changed to 116.5 g and 71.4 g, respectively. Thus, 171 g of a white powder (referred to as polycondensation catalyst B) was obtained.

Found values: Ti, 6.5; Mg, 8.1; P, 9.8; C, 23.8; H, 5.1 (% by weight)

The values of L/M and T/C, which were calculated in the same manner as in Example 1, were found to be 1.0 and 0.27, respectively. This catalyst showed satisfactory storage stability in ethylene glycol, and no precipitate formation was observed. The pH thereof was 6.1.

Example 3

Preparation of Polycondensation Catalyst (Polycondensation Catalyst C)

Synthesis was conducted in the same manner as in Example 1, except that the amounts of the magnesium acetate tetrahydrate and the ethyl acid phosphate were changed to 93.1 g and 59.7 g, respectively. Thus, 141 g of a white powder (referred to as polycondensation catalyst C) was obtained.

Found values: Ti, 7.4; Mg, 7.5; P, 9.5; C, 24.6; H, 5.7 (% by weight)

The values of L/M and T/C, which were calculated in the same manner as in Example 1, were found to be 1.4 and 0.30, respectively. This catalyst showed satisfactory storage stability in ethylene glycol, and no precipitate formation was observed. The pH thereof was 6.1.

Example 4

Preparation of Polycondensation Catalyst (Polycondensation Catalyst D)

Into a 500-mL eggplant type flask made of glass and equipped with a stirrer was introduced 116.6 g of magnesium acetate tetrahydrate, followed by 250 g of absolute ethanol (purity, 99% or higher). Furthermore, 71.6 g of ethyl acid phosphate was added thereto. The resultant mixture was stirred at room temperature for 20 minutes to thereby obtain a homogeneous solution. Subsequently, 75.0 g of tetra-n-butyl titanate was added. This liquid was transferred to a 1-L eggplant type flask and concentrated with an evaporator at 60° C. for about 2 hours to distill off the solvent until 216.5 g of a viscous liquid (polycondensation catalyst D) was obtained as a residue.

Found values: Ti, 6.0; Mg, 7.5; P, 9.0; C, 22.2 (% by weight)

Subsequently, 205.5 g of ethylene glycol was added to the residue to regulate the amount of the contents to 422 g. The resultant mixture was further heated at 80° C. and 5 Torr to distill off low-boiling substances for 2 hours. Thus, a solution of polycondensation catalyst D was obtained.

In polycondensation catalyst D, the values of L/M and T/C, which were calculated in the same manner as in Example 1, were found to be 1.6 and 0.27, respectively. The concentration of titanium atoms in the polymerization catalyst solution was 2.5% by weight. The proportion of titanium atoms to magnesium atoms to phosphorus atoms (weight ratio) in the solution was 1:1.25:1.5.

This solution of polycondensation catalyst D had satisfactory storage stability, and no precipitate formation was observed at all. The pH thereof was 5.8.

Example 5

Preparation of Polycondensation Catalyst (Polycondensation Catalyst E)

Into a 300-mL eggplant type flask made of glass and equipped with a stirrer was introduced 23.6 g of magnesium acetate tetrahydrate. Furthermore, 126 g of absolute ethanol (purity, 99% or higher) and 37.5 c of tetra-n-butyl titanate were successively added thereto to obtain a homogeneous solution. Subsequently, 17.2 g of monobutoxy phosphate (BAP) was added thereto and the resultant mixture was stirred for further 1 hour. The precipitate which had generated in a slight amount was removed by filtration, and the filtrate was concentrated with an evaporator for about 2 hours using an oil bath having a set temperature of 60° C. The ethanol was thus distilled off. As a result, a transparent viscous liquid was obtained as a residue. Furthermore, the temperature of the oil bath was elevated to 80° C. and the concentration was continued. Thus, 53 g of a white powder (referred to as polycondensation catalyst E) was obtained.

Found values: Ti, 13.0; Mg, 6.7; P, 7.9; C, 29.1; H, 5.4 (% by weight)

Rational formula:

$TiMg(C_4H_9O_4P)(CH_3COO)_{1.07}(OH)_{2.26}(OBu)_{0.74}$

Calculated values: Ti, 12.6; Mg, 6.4; P, 8.2; C, 28.8; H, 5.6 (% by weight)

The values of L/M and T/C, which were calculated in the same manner as in Example 1, were found to be 1.1 and 0.46, respectively. This catalyst showed satisfactory storage stability in ethylene glycol, and no precipitate formation was observed. The pH thereof was 6.1.

Example 6

Preparation of Polycondensation Catalyst
(Polycondensation Catalyst F)

Synthesis was conducted in the same manner as in Example 1, except that the amounts of the magnesium acetate tetrahydrate and the ethyl acid phosphate were changed to 62.0 g and 35.8 g, respectively. Thus, 108 g of a light-yellow powder (polycondensation catalyst F) was obtained.

Found values: Ti, 10.3; Mg, 6.8; P, 7.8; C, 25.1; H, 5.3 (% by weight)

The values of L/M and T/C, which were calculated in the same manner as in Example 1, were found to be 1.0 and 0.41, respectively. This catalyst showed satisfactory storage stability in ethylene glycol, and no precipitate formation was observed. The pH thereof was 6.1.

Comparative Example 1

Preparation of Polycondensation Catalyst
(Polycondensation Catalyst G)

Into a 500-mL eggplant type flask made of glass and equipped with a stirrer was introduced 31.8 g of magnesium acetate tetrahydrate. Furthermore, 226 g of absolute ethanol (purity, 99% or higher) and 50.5 g of tetra-n-butyl titanate were successively added thereto to obtain a homogeneous solution. Subsequently, 17.2 g of orthophosphoric acid (85% by weight aqueous solution) was added thereto. As a result, immediate formation of a large amount of a white precipitate was observed. This mixture, without being subjected to any treatment, was stirred for 2 hours and then allowed to stand for 1 hour. The white precipitate thus sedimented was taken out by filtration, washed with acetone and diethyl ether, and then air-dried. The white solid (referred to as polycondensation catalyst G) obtained in an amount of 50 g was pulverized into a powder with an agate mortar.

Found values: Ti, 15.0; Mg, 7.4; P, 9.3; C, 15.9; H, 4.5 (% by weight)

Polycondensation catalyst G showed no solubility in ethylene glycol at all and was unable to be evaluated for storage stability.

The values of L/M and T/C, which were calculated in the same manner as in Example 1, were found to be 0.93 and 0.94, respectively.

It can be seen that such a catalyst in which the value of T/C exceeds 0.50 lacks solubility in ethylene glycol, is difficult to handle, and is inconvenient in practical use.

Comparative Example 2

Preparation of Polycondensation Catalyst
(Polycondensation Catalyst H)

Into a 500-mL eggplant type flask made of glass and equipped with a stirrer was introduced 47.3 g of magnesium acetate tetrahydrate. Furthermore, 300 g of ethylene glycol and 75.0 g of tetra-n-butyl titanate were successively added thereto. The resultant mixture was stirred for 5 hours. Thereafter, the white precipitate yielded in a large amount was recovered by filtration. The white precipitate obtained was washed with acetone and diethyl ether and then vacuum-dried to obtain 50 g of a white substance in the form of fine crystals (referred to as polycondensation catalyst H).

This substance was subjected to single-crystal X-ray diffractometry. As a result, the substance was found to be a metal complex in which ethylene glycol molecules were coordinated to titanium and magnesium in a ratio of 2:1 (by mole).

Rational formula: $TiMg(C_6H_{12}O_6)$

Found values: Ti, 19.0; Mg, 9.5; C, 28.1, H, 4.5 (% by weight)

Polycondensation catalyst H showed no solubility in ethylene glycol at all and was unable to be evaluated for storage stability.

The content of acetato in polycondensation catalyst H was below the detection limit. The values of L/M and T/C, which were calculated in the same manner as in Example 1, were 0 and 0.66, respectively.

Comparative Example 3

Preparation of Polycondensation Catalyst
(Polycondensation Catalyst I)

Into a 1-L eggplant type flask made of glass and equipped with a stirrer was introduced 500 g of ethylene glycol. Furthermore, magnesium acetate tetrahydrate, ethyl acid phosphate, and tetra-n-butyl titanate were successively added thereto in amounts of 23.3 g, 11.9 g, and 12.5 g, respectively. The contents were stirred/mixed at room temperature for 1 hour. Thus, a solution of a catalyst (referred to as polycondensation catalyst I) having a titanium atom concentration of 0.32% by weight was obtained.

With respect to this solution of polycondensation catalyst I, the values of L/M and T/C are calculated on the assumption that the catalyst is a mixture of the ethyl acid phosphate, magnesium acetate tetrahydrate, and tetra-n-butyl titanate used as catalyst components. They are 2.0 and 0.12, respectively.

The solution of polycondensation catalyst I was allowed to stand at 23° C. and, after 2 weeks, examined for a precipitate. As a result, no precipitate was observed at all. The pH thereof was 5.5.

Table 1 summarizes the catalyst name, catalyst form, contents of titanium, magnesium, carbon, and phosphorus atoms in the catalyst, total content of acetic acid and acetato in the catalyst, butanol content (% by weight) in the catalyst, and values of L/M (molar ratio), T/C (weight ratio), M/P (molar ratio), and T/P (molar ratio) calculated from those, etc. with respect to each of Examples 1 to 6 and Comparative Examples 1 to 3. Furthermore, the degree of weight reduction in production (value obtained by dividing the catalyst weight by the total weight of the raw-material compounds other than the alcohol), which is a measure of the degree of catalyst concentration, the results of evaluation of catalyst storage stability, and the results of pH measurement are shown.

TABLE 1

| | Catalyst Preparation Example | | | | | | | | |
|---|---|---|---|---|---|---|---|---|---|
| | Example 1 | Example 2 | Example 3 | Example 4 | Example 5 | Example 6 | Comparative example 1 | Comparative example 2 | Comparative example 3 |
| Catalyst name | A | B | C | D | E | F | G | H | I |
| Phosphorus compound used | EAP | EAP | EAP | EAP | BAP | EAP | ortho-phosphoric acid | — | EAP |

TABLE 1-continued

| | | Catalyst Preparation Example | | | | | | Comparative example 1 | Comparative example 2 | Comparative example 3 |
|---|---|---|---|---|---|---|---|---|---|---|
| | | Example 1 | Example 2 | Example 3 | Example 4 | Example 5 | Example 6 | | | |
| Results of catalyst composition analysis | Catalyst form | powder | powder | powder | viscous liquid | powder | powder | powder | powder | solution |
| | Titanium (wt %) | 6.0 | 6.5 | 7.4 | 6.0 | 13.0 | 10.3 | 15.0 | 19.0 | — |
| | Magnesium (wt %) | 8.8 | 8.1 | 7.5 | 7.5 | 6.7 | 6.8 | 7.4 | 9.5 | — |
| | Phosphorus (wt %) | 9 | 9.8 | 9.5 | 9.0 | 7.9 | 7.8 | 9.3 | 0 | — |
| | Carbon (wt %) | 26.5 | 23.8 | 24.6 | 22.2 | 29.1 | 25.1 | 15.9 | 28.1 | — |
| | Acetic cid and acetato (wt %) | 28.3 | 20.9 | 18.5 | 29.7 | 16.7 | 16 | 16.3 | 0 | 26.9 |
| | Butanol (wt %) | 7.1 | 5.2 | 9.3 | 4.7 | 14.2 | 15.4 | 13.6 | 0 | 22.0 |
| | L/M (molar ratio) | 1.3 | 1.0 | 1.4 | 1.6 | 1.1 | 1.0 | 1.0 | 0 | 2.0 |
| | T/C (weight ratio) | 0.23 | 0.27 | 0.3 | 0.27 | 0.46 | 0.41 | 0.66 | 0.66 | 0.12 |
| | M/P (molar ratio) | 1.28 | 1.06 | 1.02 | 1.06 | 1.0 | 1.0 | 1.0 | 0.43 | 1.28 |
| | T/P (molar ratio) | 0.43 | 0.43 | 0.52 | 0.43 | 1.0 | 0.78 | 1.0 | 0.43 | 0.43 |
| | Ti/Mg/P (weight ratio) | 4/6/6 | 4/5/6 | 4/4/5 | 4/5/6 | 8/4/6.5 | 6/4/4.5 | 8/4/6.5 | 2/1/0 | 4/6/6 |
| Degree of weight reduction in production | | 0.64 | 0.6 | 0.62 | 0.82 | 0.68 | 0.63 | 0.52 | 0.55 | 1.0 |
| Storage stability | | good | good | good | good | good | good | insoluble | insoluble | good |
| pH | | 6.2 | 6.1 | 6.1 | 5.8 | 6.1 | 6.1 | — | — | 5.5 |

EPA: ethyl acid phosphate
BAP: monobutoxy phosphate

It can be seen from Table 1 that the polycondensation catalysts for polyester production of the invention have excellent long-term storage stability.

Examples and Comparative Examples Concerning Polyester Resin Production

Examples and Comparative Examples concerning the production of polyester resins are shown below.

The average degree of esterification, number-average degree of polymerization, intrinsic viscosity, rate of solid-phase polymerization, content of terminal carboxyl groups, color tone, contents of diethylene glycol and isophthalic acid units, and metal content of each of the polyester resins in the following Examples and Comparative Examples were determined in the following manners.

<Average Degree of Esterification>

A solution prepared by dissolving a sample in a deuterized chloroform/hexafluoroisopropanol (7/3 by weight) mixed solvent in a concentration of 3% by weight was analyzed with a nuclear magnetic resonance apparatus ("JNM-EX270" manufactured by JEOL Ltd.) to obtain a 1H-NMR spectrum. Each peak was assigned, and the amount of terminal carboxyl groups (A mol/ton of sample) was calculated from the integrals of peaks. The degree of esterification (E, %) was calculated as the proportion of the esterified carboxyl groups of the terephthalic acid units to all carboxyl groups of the units using the following equation.

Degree of esterification$(E)=[1-A/\{(1000000/192.2) \times 2\}] \times 100$

<Number-Average Degree of Polymerization>

A solution prepared by dissolving a sample in a deuterized chloroform/hexafluoroisopropanol (7/3 by weight) mixed solvent in a concentration of 2% by weight and adding 20 μL of pyridine-d5 thereto was analyzed with a nuclear magnetic resonance apparatus ("JNM-EX270" manufactured by JEOL Ltd.) to obtain a 1H-NMR spectrum. Each peak was assigned. The number of terminal hydroxyl groups [OH] (mol/ton of sample), number of terminal carboxyl groups [COOH] (mol/ton of sample), number of terminal diethylene glycol groups [DEG] (mol/ton of sample), and number of terminal isophthalic acid [IPA] (mol/ton of sample) were calculated from the proportions of the integrals of the corresponding peaks to the integral for benzene ring protons of the terephthalic acid units. The sum of the numbers of these terminal groups was taken as the number of all terminal groups to determine the number-average degree of polymerization (n) using the following equation.

Number-average degree of polymerization$(n)=1000000/\{([OH]+[COOH]+[DEG]+[IPA]\}/2/192.2$ <Determination of Intrinsic Viscosity [η1], [η2]>

A 0.25-g portion of a sample prepared by freeze-pulverizing a pellet-form polyester resin was added to a phenol/tetrachloroethane (1/1 by weight) mixture as a solvent in such a proportion as to result in a concentration (c) of 1.0 g/dL, and the resultant mixture was held at 110° C. for 30 minutes in the case of a melt polycondensation resin or at 120° C. for 30 minutes in the case of a solid-phase polycondensation resin to thereby dissolve the sample. Thereafter, a Ubbelohde's capillary viscometer was used to measure at 30° C. the relative viscosity (ηrel) of the solution, i.e., the viscosity relative to that of the original liquid. Furthermore, the specific viscosity (ηsp) was determined from the relative viscosity, i.e., [relative viscosity (ηrel)]−1, and the ratio (ηsp/c) between the specific viscosity (ηsp) and the concentration (c) was determined. Likewise, solutions having concentrations (c) regulated to 0.5 g/dL, 0.2 g/dL, and 0.1 g/dL were examined to determine the respective ratios (ηsp/c). The concentration (c) was extrapolated to 0 and the ratio (ηsp/c) in this case was determined as intrinsic viscosity (dL/g) from those values.

<Rate of Solid-Phase Polycondensation>

The difference between the intrinsic viscosity of a solid-phase polycondensation resin ([η2]) and the intrinsic viscosity of a melt polymerization resin ([η1]), i.e., [η2]−[η1], was divided by the time period of the solid-phase polycondensation (8 hours) and this value was taken as the rate of solid-phase polycondensation.

<Amount of Terminal Carboxyl Groups>

A polyester resin in the form of chips was pulverized, subsequently dried with a hot-air drying oven at 140° C. for 15 minutes, and then cooled to room temperature in a desiccator. A 0.1-g portion of this sample was precisely weighed out and placed in a test tube, and 3 mL of benzyl alcohol was added thereto. The sample was dissolved in the alcohol at 195° C. for 3 minutes while bubbling dry nitrogen gas thereinto. Subsequently, 5 mL of chloroform was gradually added to the solution, which was cooled to room temperature. One or two drops of Phenol Red indicator were added to the solution, and this solution was titrated with a 0.1-N benzyl alcohol solution of sodium hydroxide with stirring while bubbling dry nitrogen gas thereinto. At the time when the color of the solution changed from yellow to red, the titration was terminated. On the other hand, the same operation as the above one except that the polyester resin sample was not dissolved was conducted as a blank. The amount of terminal carboxyl groups (acid value) was calculated using the following equation <1>.

$$\text{Terminal carboxyl amount}(eq/ton) = (a-b) \times 0.1 \times f/w \quad <1>$$

(In equation <1>, symbol a is the amount (μL) of the 0.1-N benzyl alcohol solution of sodium hydroxide used for the titration; b is the amount (μL) of the 0.1-N benzyl alcohol solution of sodium hydroxide used for the titration of the blank; w is the amount (g) of the polyester resin sample; and f is the titer of the 0.1-N benzyl alcohol solution of sodium hydroxide.)

Incidentally, the titer (f) of the 0.1-N benzyl alcohol solution of sodium hydroxide was determined by the following method. Five milliliters of methanol was placed in a test tube, and one or two drops of an ethanol solution of Phenol Red were added thereto as an indicator. This methanol was titrated to a color change point with 0.4 mL of the 0.1-N benzyl alcohol solution of sodium hydroxide. Subsequently, 0.2 mL of 0.1-N aqueous hydrochloric acid solution having a known titer was added as a standard solution to the methanol. This methanol was titrated again with the 0.1-N benzyl alcohol solution of sodium hydroxide to the color change point (these operations were conducted with the bubbling of dry nitrogen gas). The titer (f) was calculated using the following equation <2>.

$$\text{Titer}(f) = [\text{titer of the 0.1-N aqueous hydrochloric acid solution}] \times [\text{amount of the 0.1-N aqueous hydrochloric acid solution added (μL)}] / [\text{amount of the 0.1-N benzyl alcohol solution of sodium hydroxide used for titration (μL)}] \quad <2>$$

<Color Tone>

A polyester resin in the form of chips obtained through polycondensation reactions was packed into a cylindrical cell for powder examination having an inner diameter of 30 mm and a depth of 12 mm. Colorimetric color-difference meter ZE-2000 (manufactured by Nippon Denshoku Industries Co., Ltd.) was used to determine the value of color b in the chromaticity coordinates in Hunter's color difference formula according to the Lab color system as provided for in Reference Example 1 in JIS Z8730, by the reflection method. This measurement was made on four points, while rotating the examination cell by 90° at a time. The simple average of these four values was taken as the color tone.

<Contents of Diethylene Glycol (DEG) and Isophthalic Acid (IPA) Units>

Polyester chips were dissolved in deuterized trifluoroacetic acid at ordinary temperature to obtain a 3% by weight solution. Nuclear magnetic resonance apparatus JNM-EX270, manufactured by Nippon Denshoku Ltd., was used to obtain a 1H-NMR spectrum. Each peak was assigned. From integral proportions of such peaks, the diethylene glycol amount (% by mole) and isophthalic acid amount (% by mole) in the polyester resin were calculated.

Example 7

Esterification Reaction

A continuous polymerizer was used which comprised a slurrying vessel, two esterification reaction vessels serially connected to the slurrying vessel, and three melt polycondensation vessels serially connected to the second-stage esterification reaction vessel. High-purity terephthalic acid, isophthalic acid, and ethylene glycol were continuously fed to the slurrying vessel at rates of 90.85 parts by weight, 2.45 parts by weight, and 57.50 parts by weight, respectively, per hour and simultaneously stirred and mixed together to prepare a slurry. This slurry was fed successively to the first-stage esterification reaction vessel regulated so as to be operated in a nitrogen atmosphere under the conditions of 260° C., a relative pressure of 100 kPa (1.0 kg/cm$^2$ G), and an average residence time of 4 hours and the second-stage esterification reaction vessel regulated so as to be operated in a nitrogen atmosphere under the conditions of 260° C., a relative pressure of 5 kPa (0.05 kg/cm$^2$ G), and an average residence time of 1.5 hours. Polycondensation catalyst A prepared in Example 1 was introduced, in the form of an ethylene glycol solution having a titanium metal concentration of 844 ppm and a water concentration of 0.5% by weight, into the second-stage esterification reaction vessel through an upper piping at a rate of 0.945 parts by weight per hour so as to result in a titanium concentration of 8 ppm of the polyester resin to be obtained. The average degrees of esterification in the first-stage and second-stage esterification reaction vessels were 89±1% and 96±1%, respectively. The number-average degree of polymerization in the second stage was 6.5.

Diethylene glycol was fed to the second-stage esterification reaction vessel so as to yield a polyester resin in which the number of moles of diethylene glycol therein was 3.0% by mole.

<Melt Polycondensation Reaction>

Subsequently, the esterification reaction product obtained above was continuously sent to the melt polycondensation vessels. Namely, the reaction product was continuously sent to the first-stage melt polycondensation vessel regulated so as to be operated under the conditions of 270° C., an absolute pressure of 2.6 kPa (20 Torr), and a residence time of 1.2 hours, subsequently to the second-stage melt polycondensation vessel regulated so as to be operated under the conditions of 278° C., an absolute pressure of 0.33 kPa (2.5 Torr), and a residence time of 1.0 hour, and then to the third-stage melt polycondensation vessel regulated so as to be operated under the conditions of 280° C. and a residence time of 1.0 hour. The melt polycondensation of the esterification reaction product was conducted while regulating the pressure in the third-stage melt polycondensation vessel so as to yield a polyester resin having an intrinsic viscosity ([η1]) of 0.65±0.01 dL/g. The resultant reaction mixture was continuously discharged in the form of a strand through a discharge orifice formed in a bottom part of the melt polycondensation vessel. The strand was cooled with water and cut into chips with a cutter. Thus, a polyester resin was produced.

Thirty granules were arbitrarily taken out of the chip-form polyester resin obtained, and each granule was weighed. As a result, the average value per granule was 17 mg.

<Solid-Phase Polycondensation Reaction>

Subsequently, the polyester resin in the form of chips obtained by the melt polymerization was continuously fed to a stirring crystallization vessel kept at 160° C., so as to result in a residence time of 5 minutes. The polyester resin was thus crystallized. In inert oven Type IPHH-201, manufactured by ESPEC Company, the resin crystallized was further dried at 160° C. for 2 hours and then heated at 210° C. for 8 hours in a 40 L/min nitrogen stream (oxygen concentration, 2 ppm) to conduct solid-phase polycondensation.

Example 8

Polycondensation reactions were conducted in the same manner as in Example 7, except that polycondensation catalyst B prepared in Example 2 was used in place of polycondensation catalyst A prepared in Example 1.

Example 9

Polycondensation reactions were conducted in the same manner as in Example 7, except that polycondensation catalyst C prepared in Example 3 was used in place of polycondensation catalyst A prepared in Example 1.

Example 10

Polycondensation reactions were conducted in the same manner as in Example 7, except that polycondensation catalyst C prepared in Example 3 was used in place of polycondensation catalyst A prepared in Example 1, that the catalyst was used in an amount of 4 ppm in terms of titanium atom amount in the polyester resin to be obtained, and that the catalyst was continuously added at a place in the piping for continuously sending the esterification reaction product to the melt polycondensation vessels.

Example 11

Polycondensation reactions were conducted in the same manner as in Example 7, except that the solution of polycondensation catalyst D prepared in Example 4 was further diluted with ethylene glycol to a titanium atom concentration of 844 ppm and this dilution was used in place of polycondensation catalyst A prepared in Example 1.

Example 12

Polycondensation reactions were conducted in the same manner as in Example 7, except that polycondensation catalyst E prepared in Example 5 was used in place of polycondensation catalyst A prepared in Example 1.

Example 13

Polycondensation reactions were conducted in the same manner as in Example 7, except that polycondensation catalyst F prepared in Example 6 was used in place of polycondensation catalyst A prepared in Example 1.

Comparative Example 4

Polycondensation reactions were conducted in the same manner as in Example 7, except that polycondensation catalyst G prepared in Comparative Example 1 was used in place of polycondensation catalyst A prepared in Example 1. As a result, even when the third-stage melt polycondensation vessel was operated at the upper limit of vacuum, polymerizability did not increase to a target viscosity and the polymerization could not be continued.

Comparative Example 5

Polycondensation reactions were conducted in the same manner as in Example 7, except that a slurry-form catalyst solution prepared by adding 2.3 parts by weight of polycondensation catalyst H prepared in Comparative Example 2 to 500 parts by weight of ethylene glycol to adjust the titanium atom concentration to 840 ppm and mixing the resultant mixture with 1.4 parts by weight of ethyl acid phosphate to adjust the phosphorus atom concentration to 633 ppm was used in place of polycondensation catalyst A prepared in Example 1. As a result, even when the third-stage melt polycondensation vessel was operated at the upper limit of vacuum, polymerizability did not increase to a target viscosity and the polymerization could not be continued.

Comparative Example 6

Polycondensation reactions were conducted in the same manner as in Example 7, except that the solution of polycondensation catalyst I prepared in Comparative Example 3 was used in place of polycondensation catalyst A prepared in Example 1. As a result, even when the third-stage melt polycondensation vessel was operated at the upper limit of vacuum, polymerizability did not increase to a target viscosity and the polymerization could not be continued.

Table 2 summarizes production conditions, properties of the melt polycondensation product, properties of the solid-phase polycondensation product, etc. with respect to each of Examples 7 to 13 and Comparative Examples 4 to 6.

TABLE 2

| Polycondensation Reaction Example | | Example 7 | Example 8 | Example 9 | Example 10 | Example 11 | Example 12 | Example 13 |
|---|---|---|---|---|---|---|---|---|
| Production conditions | Name of catalyst used | A | B | C | C | D | E | F |
| | Position of catalyst addition* | (1) | (1) | (1) | (2) | (1) | (1) | (1) |
| | Amount of catalyst added (concentration in polyester resin) Ti/Mg/P amounts (wt ppm) | 8/12/12 | 8/10/12 | 8/8/10 | 4/4/5 | 8/10/12 | 8/4/6.5 | 8/5.3/6 |

TABLE 2-continued

| | | | | | | | |
|---|---|---|---|---|---|---|---|
| | Degree of vacuum in third-stage melt polycondensation vessel (kPa) | 0.11 | 0.12 | 0.13 | 0.23 | 0.14 | 0.13 | 0.24 |
| Melt polycondensation product | Intrinsic viscosity [η1] (dL/g) | 0.65 | 0.65 | 0.65 | 0.65 | 0.64 | 0.65 | 0.65 |
| | Terminal carboxyl group amount (eq/ton) | 14 | 14 | 12 | 12 | 13 | 12 | 14 |
| | Color tone L | 61.0 | 60.8 | 60.3 | 61.6 | 61.2 | 61.0 | 61.0 |
| | a | −0.5 | −0.5 | −0.7 | −0.7 | −0.5 | −0.5 | −1.5 |
| | b | 1.3 | 1.8 | 3.3 | 3.1 | 2.3 | 2.0 | 5.4 |
| | DEG (% by mole) | 3.0 | 3.0 | 3.0 | 3.2 | 3.0 | 3.0 | 3.0 |
| | IPA (% by mole) | 2.7 | 2.7 | 2.7 | 2.7 | 2.7 | 2.7 | 2.7 |
| Solid-phase polycondensation product | Intrinsic viscosity [η2] (dL/g) | 0.82 | 0.82 | 0.82 | 0.83 | 0.80 | 0.82 | 0.84 |
| | Rate of polymerization (dL/g/h) | 0.021 | 0.021 | 0.021 | 0.023 | 0.020 | 0.021 | 0.024 |

| Polycondensation Reaction Example | | Comparative example 4 | Comparative example 5 | Comparative example 6 | Example 20 | Example 21 |
|---|---|---|---|---|---|---|
| Production conditions | Name of catalyst used | G | H | I | J | K |
| | Position of catalyst addition* | (1) | (1) | (1) | (2) | (1) |
| | Amount of catalyst added (concentration in polyester resin) Ti/Mg/P amounts (wt ppm) | 8/4/6.5 | 8/4/0 | 8/12/12 | 4/2.2/2.8 | 8/8.2/10 |
| | Degree of vacuum in third-stage melt polycondensation vessel (kPa) | — | — | — | 0.24 | 0.22 |
| Melt polycondensation product | Intrinsic viscosity [η1] (dL/g) | polymerizability remained low | polymerizability remained low | polymerizability remained low | 0.65 | 0.65 |
| | Terminal carboxyl group amount (eq/ton) | — | — | — | 15 | 16 |
| | Color tone L | — | — | — | 61.7 | 61.0 |
| | a | — | — | — | −1.7 | −1.1 |
| | b | — | — | — | 4.0 | 2.5 |
| | DEG (% by mole) | — | — | — | 3.0 | 3.0 |
| | IPA (% by mole) | — | — | — | 2.7 | 2.7 |
| Solid-phase polycondensation product | Intrinsic viscosity [η2] (dL/g) | — | — | — | 0.83 | 0.82 |
| | Rate of polymerization (dL/g/h) | | | | 0.023 | 0.021 |

*(1): second-stage esterification reaction vessel
(2): piping for sending esterification reaction product to melt polycondensation vessels

Example 14

Into a reaction vessel equipped with a stirrer, distillation tube, and pressure-reducing device were introduced 112.9 g of terephthalic acid and 183.1 g of 1,4-butanediol. A solution prepared by dissolving catalyst F obtained in Example 6 in 1,4-butanediol in a concentration of 4.5% by weight in terms of titanium atom concentration was added thereto. This solution was added in such an amount as to yield poly(butylene terephthalate) having a titanium atom content of 40 ppm.

After the atmosphere in this reaction vessel was replaced with nitrogen, the reaction vessel was heated with a 150° C. oil bath. The temperature in the reaction vessel was elevated to 220° C. over 60 minutes and kept at 220° C. for 170 minutes while stirring the liquid reaction mixture, keeping the internal pressure of the vessel at 79 kPa, and distilling off the water generated to thereby conduct an esterification reaction. After completion of the esterification reaction, the reaction mixture was heated to 245° C. over 60 minutes and held at 245° C. On the other hand, the pressure was reduced from 79 kPa to 0.13 kPa over 85 minutes and kept at 0.13 kPa. Thus, a polycondensation reaction was conducted. Through the polycondensation reaction time (period from initiation of pressure reduction from 79 kPa to termination of the reaction) of 170 minutes, poly(butylene terephthalate) was obtained which had an intrinsic viscosity of 0.909 dL/g and color tone values L, a, b of 8.41, −0.6, and −1.5, respectively.

It can be seen from Table 2 and the results in Example 14 that the polyester resin obtained with the polycondensation catalyst for polyester production of the invention is satisfactory especially in color tone.

[Example and Comparative Example Concerning Polyester Resin Bottle Molding]

An Example and a Comparative Example concerning the molding of polyester resin bottles are shown below.

In the following Example and Comparative example, the crystallization temperature Tc1, water content, and surface temperature of each preform and the haze of each molded bottle were determined in the following manners.

<Crystallization Temperature Tc1>

The crystallization temperature means a crystallization peak temperature as measured with a differential scanning calorimeter (DSC) during heating in accordance with JIS K7121. A sample weighing about 10 mg was cut out of the top flat area in the mouth part of a preform with a sharp edged tool, e.g., a cutting knife, and examined with DSC Type 220C, manufactured by Seiko Instrument Inc., at a heating rate of 20° C./min. The temperature corresponding to the exothermic peak appearing first is the crystallization temperature Tc1.

<Water Content>

A sample weighing about 1 g was cut out, with nippers or the like, of the mouth part of a preform which had undergone a moisture absorption treatment. This sample for water content determination was examined for water content with Karl Fischer moisture meter CA-06, VA-06, manufactured by Mitsubishi Chemical Corp., using Aquamicron AX and Aquamicron CKS as an anolyte and a catholite, respectively, under the conditions of a heating temperature of 230° C., heating time of 30 minutes, and nitrogen flow rate of about 200 mL/min.

<Surface Temperature of Preform>

Noncontact handy thermometer IT2-80, manufactured by Keyence Corporation, regulated so as to have an emissivity of 0.90 was used to measure the surface temperature of a preform after a heat treatment, with the thermometer placed at a distance of about 0.3 m.

<Haze>

A sample was cut out of the barrel part of a polyester resin container obtained, and was examined for haze with a hazeometer (SM Color Computer MODEL SM-5, manufactured by Suga Test Instruments Co., Ltd.).

Example 15

About 5 kg of the polyester resin chips obtained through solid-phase polycondensation in Example 12 (using polycondensation catalyst E) were evenly placed in a vat made of stainless steel having length×width×height dimensions of about 300×500×80 mm. The chips were vacuum-dried at 145° C. for about 12 hours with vacuum dryer DP63, manufactured by Yamato Scientific Co., Ltd. The raw-material resin which had undergone the vacuum drying was placed in resin dryer Challenger D-50, manufactured by Kawata MFG. Co., Ltd., for the purpose of preventing moisture absorption during molding and subjected to the injection molding of preforms while keeping the resin at 135° C.

For the injection molding was used an injection molding machine (Type ASB-50TH, manufactured by Nissei ASB Co., Ltd.) for a multilayer stretch blow-molding machine. The injection molding was conducted at a set cylinder temperature and a set hot-runner temperature of 270° C. each under the conditions of an injection period of 1.5 seconds, pressure-holding period of 13.5 seconds, cooling period of 10 seconds, and mold temperature of 15° C. to produce preforms having a mouth part and having a length of 100 mm, outer diameter of 25 mm, and wall thickness of 4 mm (internal volume, 30 mL).

The preforms obtained were placed in a thermo-hydrostatic chamber (thermo-hydrostatic chamber Platinous Rainbow Type PR-1GP, manufactured by Tabai Espec Corp.) having a set temperature of 40° C. and a set relative humidity of 90% to conduct a moisture absorption treatment. The time period of the treatment was changed to obtain preforms differing in water content.

The preforms obtained were subjected to stretch blow molding by the following method while regulating the preform heating period. The hazes of the bottles obtained by stretch blow molding were measured.

Namely, a rotary stretch blow-molding machine was used in which a preform was moved by 90° at a time in the order of a preform introduction/bottle discharge part, a first heating part and a second heating part each equipped with a near-infrared heater, and a blow molding part to mold a bottle by stretch blow molding. This molding machine was operated under set conditions of a preform first-heating period in the range of from 40 seconds to 62.5 seconds, a second-heating period in the range of from 15 seconds to 37.5 seconds, and a cooling period after completion of second heating in the second heating part of 25 seconds while introducing compressed air of about 3 MPa. Thus, polyester resin containers having a length of about 200 mm, outer diameter of about 60 mm, average wall thickness of about 0.5 mm, and capacity of 500 mL.

The water contents and crystallization temperatures Tc1 of the preforms and the hazes of the molded bottles were determined. Those surface temperatures of preforms which result in a haze of 1% or lower are regarded as preform surface temperatures which enable the molding of satisfactory bottles. The results of these are shown in Table 3.

TABLE 3

| | | No. | | |
| --- | --- | --- | --- | --- |
| | 1 | 2 | 3 | 4 |
| Water content of preform (ppm) | 100 | 3100 | 6300 | 7600 |
| Crystallization temperature Tc1 (° C.) | 172.6 | 169.2 | 167.4 | 163.1 |
| | Surface temperature of preform (° C.) | Bottle haze (%) | | |
| Haze of molded bottle | 85 | 1.5 | 0.9 | 0.9 | 0.9 |
| | 88 | 0.6 | 0.5 | 0.5 | 0.4 |
| | 94 | 0.4 | 0.4 | 0.3 | 0.4 |
| | 97 | 0.4 | 0.4 | 0.4 | 0.4 |
| | 99 | 0.4 | 0.4 | 0.4 | 0.3 |
| | 102 | 0.4 | 0.6 | 0.6 | 0.6 |
| | 105 | 0.5 | 0.5 | 1.0 | 1.5 |
| | 109 | 0.6 | 1.5 | 2.8 | 3.0 |
| | 112 | 1.7 | 4.6 | 5.3 | 7.6 |
| Preform surface temperature enabling molding of satisfactory bottle (° C.) | 88-109 | 85-105 | 85-105 | 85-102 |

Comparative Example 7

Injection molding, water content examination, and crystallization temperature Tc1 examination of preforms, stretch blow molding of bottles, and haze examination thereof were conducted in the same manners as in Example 15, except that UNIPET BK2180, manufactured by Japan Unipet Co., Ltd., was used in place of the polyester resin chips obtained through solid-phase polycondensation in Example 12. The preform surface temperatures enabling the molding of satisfactory bottles were determined in the same manner. The results thereof are shown in Table 4.

TABLE 4

|  |  | No. | | | |
| --- | --- | --- | --- | --- | --- |
|  |  | 5 | 6 | 7 | 8 |
| Water content of preform (ppm) | | 0 | 3300 | 6200 | 7800 |
| Crystallization temperature Tc1 (° C.) | | 167.2 | 145 | 143.6 | 144.1 |
| | Surface temperature of preform (° C.) | Bottle haze (%) | | | |
| Haze | 85 | 1.2 | 1.1 | 0.8 | 0.8 |
| of | 88 | 0.5 | 0.5 | 0.5 | 0.4 |
| molded | 94 | 0.4 | 0.4 | 0.4 | 0.3 |
| bottle | 97 | 0.3 | 0.4 | 0.4 | 0.6 |
|  | 99 | 0.5 | 0.5 | 1.3 | 1.9 |
|  | 102 | 0.5 | 2.1 | molding was impossible | molding was impossible |
|  | 105 | 0.6 | molding was impossible | molding was impossible | molding was impossible |
|  | 109 | 2.2 | molding was impossible | molding was impossible | molding was impossible |
|  | 112 | 4.4 | molding was impossible | molding was impossible | molding was impossible |
| Preform surface temperature enabling molding of satisfactory bottle (° C.) | | 88-105 | 88-99 | 85-97 | 85-97 |

A comparison between Table 3 and Table 4 shows that the preforms obtained from the polyester resin of the invention change little in crystallization temperature Tc1 even upon moisture absorption and have a wide range of preform surface temperatures at which transparent bottles can be obtained, and that stable production is hence possible.

[Examples and Comparative Example Concerning Production of Polyester Resins Containing Titanium Oxide]

Examples and a Comparative Example concerning the production of polyester resins containing titanium oxide are shown below.

Example 16

An ethylene terephthalate oligomer produced by the direct esterification method from terephthalic acid and ethylene glycol as raw materials was melted at 260° C. in an amount of 157 g. This oligomer had a degree of esterification of 96.5%. Thereafter, titanium oxide was added as a 34% by weight ethylene glycol slurry in an amount of 0.35% by weight based on the theoretical yield of the polyester resin to be obtained. Furthermore, the polycondensation catalyst prepared in Example 4 was added in an amount of 20 ppm, in terms of titanium atom amount, of the theoretical yield of the polyester resin to be obtained.

Subsequently, while the melt was being stirred with a stirrer, it was heated stepwise to 280° C. over 80 minutes. Simultaneously therewith, the pressure of the reaction system was stepwise lowered from ordinary pressure to an absolute pressure of $1.3 \times 10^2$ Pa over 60 minutes. After a temperature of 280° C. and an absolute pressure of $1.3 \times 10^2$ Pa had been reached, the temperature and pressure were kept constant.

At 270 minutes after initiation of the pressure reduction, the stirring was stopped and nitrogen gas was introduced into the system to terminate the polycondensation reaction. Thereafter, the polymer was discharged from the reaction vessel and cooled with water to thereby obtain a strand-form polymer. This polymer was cut into pellets and evaluated.

The time period from initiation of the pressure reduction to termination of the polycondensation reaction (polycondensation reaction time) and the results of determination of the intrinsic viscosity of the polyester resin obtained and the value of b in chromaticity coordinates as the color tone of the resin are shown in Table 5.

Example 17

A polycondensation reaction and evaluation were conducted in the same manners as in Example 16, except that the polycondensation catalyst prepared in Example 2 was added in an amount of 15 ppm, in terms of titanium atom amount, of the theoretical yield of the polyester resin to be obtained. The results thereof are shown in Table 5.

Comparative Example 8

Preparation of Polycondensation Catalyst

A tetrabutoxytitanium solution was prepared in the following manner.

In a nitrogen atmosphere, 100 mL of ethylene glycol was placed in a 200-mL flask and 0.7 g of tetrabutoxytitanium was dropped thereinto while stirring the contents of the flask. After completion of the dropwise addition, the contents were stirred at room temperature for 1 hour. As a result, a colorless transparent solution was obtained.

A magnesium acetate solution was separately prepared in the following manner.

In a 500-mL flask was placed 200 mL of ethylene glycol. While the contents of the flask were being stirred, 2.2 g of magnesium acetate tetrahydrate was introduced into the flask. After completion of the introduction, the contents were stirred at room temperature for 30 minutes. As a result, a colorless transparent solution was obtained.

<Melt Polycondensation>

A polycondensation reaction and evaluation were conducted in the same manners as in Example 16, except that the following ingredients were separately introduced into the reaction vessel in place of the polycondensation catalyst. Namely, the ethylene glycol solution of tetrabutoxytitanium prepared above was introduced in an amount of 6 ppm, in terms of titanium atom amount, of the theoretical yield of the polyester resin to be obtained; the ethylene glycol solution of magnesium acetate tetrahydrate was introduced in an amount of 8 ppm, in terms of magnesium atom amount, of the theoretical yield of the polyester resin to be obtained; and an ethylene glycol solution of ethyl acid phosphate was further introduced in an amount of 10 ppm of the theoretical yield of the polyester resin to be obtained. The results thereof are shown in Table 5.

TABLE 5

|  | Example 16 | Example 17 | Comparative Example 8 |
|---|---|---|---|
| Titanium amount (ppm) | 20 | 15 | 6 |
| Polycondensation reaction time (min) | 270 | 260 | 270 |
| Intrinsic viscosity (dL/g) | 0.650 | 0.624 | 0.634 |
| b in chromaticity coordinates | 10.0 | 9.7 | 15.2 |

It can be seen from Table 5 that also in the production of a polyester resin containing titanium oxide, polyester resins having a satisfactory color tone can be obtained according to the invention.

[Examples Concerning Polycondensation Catalyst Solutions and Production of Polyester Resins]

Example 18

Preparation of Polycondensation Catalyst Solution (Polycondensation Catalyst J Solution)

Into a 1-L Erlenmeyer flask equipped with a ground glass stopper was introduced 60.72 g of magnesium acetate tetrahydrate, followed by 360 g of absolute ethanol. After the contents were stirred for 30 minutes, 96.26 g of tetrabutyl titanate was introduced into the flask. The resultant mixture was stirred for 20 minutes to obtain a homogeneous solution. Subsequently, monoethyl acid phosphate (JAMP-2, manufactured by Johoku Chemical Industry Co., Ltd.; purity, 72.6% by weight; containing 14.5% by weight diethyl acid phosphate and 13.0% by weight orthophosphoric acid) was added to the solution over 30 minutes with vigorous agitation to obtain a slightly opacified solution.

This solution was transferred to a 1-L eggplant type flask, and the ethanol was distilled off under vacuum at an oil bath temperature of 80° C. until the amount of the contents reached 322.2 g.

Subsequently, 389.25 g of ethylene glycol was added thereto in nitrogen at ordinary pressure. The contents were mixed together for 15 minutes to prepare a homogeneous solution.

The solution was thereafter treated at a reduced pressure of 10 Torr ($1.3 \times 10^3$ MPa) for 40 minutes to thereby remove low-boiling substances. Thus, 508.0 g of a light-yellow polycondensation catalyst J solution was obtained. This solution had a pH of 5.4, and was a stable homogeneous solution.

Example 19

Preparation of Polycondensation Catalyst Solution (Polycondensation Catalyst K Solution)

Into a 1-L Erlenmeyer flask equipped with a ground glass stopper was introduced 48.5 g of magnesium acetate tetrahydrate. Thereto was added 140 g of ethanol. Subsequently, 31.7 g of ethyl acid phosphate (JP-502, manufactured by Johoku Chemical Industry Co., Ltd.) was added. The resultant mixture was stirred for 20 minutes to obtain a homogeneous solution. Thereto was added 38.5 g of tetrabutyl titanate over 15 minutes with stirring. This mixture was transferred to a 1-L eggplant type flask and concentrated with an evaporator on a 60° C. oil bath. The amount of the distillate recovered was 124.6 g.

Subsequently, the pressure was returned to ordinary pressure with nitrogen. Thereafter, 81.3 g of ethylene glycol was added to the residue at ordinary pressure and the resultant mixture was stirred at room temperature for 20 minutes. This liquid was treated with an evaporator at 60° C. and 5 Torr ($0.67 \times 10^{-3}$ MPa) to further distill off low-boiling substances for about 1 hour. Thus, 157.7 g of a light-yellow polycondensation catalyst K solution was obtained. This solution had a pH of 5.4, and was a stable homogeneous solution.

Table 6 summarizes the catalyst name, catalyst form, contents of titanium, magnesium, carbon, and phosphorus atoms in the catalyst, total content of acetic acid and acetato in the catalyst, butanol content (% by weight) in the catalyst, and values of L/M (molar ratio), T/C (weight ratio), M/P (molar ratio), and T/P (molar ratio) calculated from those, etc. with respect to each of Examples 18 and 19. Furthermore, the degree of weight reduction in production (value obtained by dividing the catalyst weight by the total weight of the raw-material compounds other than the alcohol), which is a measure of the degree of catalyst concentration, the results of evaluation of catalyst storage stability, and the results of pH measurement are shown.

TABLE 6

| Composition | Unit | Example 18 | Example 19 |
|---|---|---|---|
| Titanium | wt % | 2.6 | 3.4 |
| Magnesium |  | 1.4 | 3.5 |
| Diethyl phosphate |  | 1.0 | 10.9 |
| Monoethyl phosphate |  | 5.1 | 9.0 |
| Phosphoric acid |  | 0.9 | 0.0 |
| Butanol |  | 3.4 | 5.3 |
| Ethanol |  | 1.2 | 1.8 |
| Acetic acid and acetato |  | 4.6 | 13.0 |
| Ethylene glycol |  | 73.9 | 47.0 |
| Ethylene glycol monoacetate |  | 0.2 | 0.8 |
| Water |  | 1.1 | 1.4 |
| L/M (molar ratio) |  | 1.33 | 1.51 |
| T/C (weight ratio) |  | 0.49 | 0.25 |
| M/P (molar ratio) |  | 0.99 | 1.01 |
| T/P (molar ratio) |  | 0.95 | 0.50 |

TABLE 6-continued

| Composition | Unit | Example 18 | Example 19 |
|---|---|---|---|
| Ti/Mg/P (weight ratio) | | 1.0/0.54/0.70 | 1.0/1.0/1.30 |
| Degree of weight reduction in production | | 0.50 | 0.60 |
| Storage stability | | good | good |
| pH | | 5.4 | 5.4 |

Example 20

Polycondensation reactions were conducted in the same manner as in Example 7, except that the polycondensation catalyst J solution prepared in Example 18 was used in place of polycondensation catalyst A prepared in Example 1, that the catalyst was continuously added at a place in the piping for continuously sending the esterification reaction product to the melt polycondensation vessels, and that the temperatures in the first-stage, second-stage, and third-stage polymerization vessels were changed to 266° C., 283° C., and 290° C., respectively.

Example 21

Polycondensation reactions were conducted in the same manner as in Example 7, except that the polycondensation catalyst K solution prepared in Example 19 was used in place of polycondensation catalyst A prepared in Example 1 and that the temperatures in the first-stage, second-stage, and third-stage polymerization vessels were changed to 266° C., 283° C., and 290° C., respectively.

Production conditions, properties of the melt polycondensation product, properties of the solid-phase polycondensation product, etc. with respect to each of Examples 20 and 21 were summarized in Table 2 given above.

Examples B

In the following Examples, the pH and water content of each of the liquid polycondensation catalysts for polyester production were determined in the following manners.

Furthermore, the intrinsic viscosity [η], color tone, content of terminal carboxyl groups, content of diethylene glycol units, cyclic-trimer (CT) content, and rate of polycondensation reaction of each of the polyesters obtained were determined in the following manners.

<pH Measurement>

An automatic titrator (Type AUT-501) manufactured by DKK-Toa Corp. was used to measure the pH of the liquid catalyst, with the pH electrode immersed in the liquid catalyst in the air.

<Water Content Determination>

Water content measuring apparatus CV-06, manufactured by Mitsubishi Chemical Corp., was used to make a measurement based on the principle of Karl Fisher's reaction.

<Intrinsic Viscosity [η]>

In the case of a pellet-form resin, 0.25 g of a resin sample prepared by freeze-pulverizing the pellets was used. In the case of a molded article, 0.25 g of a resin sample prepared by cutting the article into pieces of nearly the same size as the pellets and then freeze-pulverizing the pieces was used. The resin sample was added to a phenol/tetrachloroethane (1/1 by weight) mixture as a solvent in such a proportion as to result in a concentration (c) of 1.0 g/dL, and the resultant mixture was held at 110° C. for 30 minutes in the case of a melt polycondensation resin and a molded article or at 120° C. for 30 minutes in the case of a solid-phase polycondensation resin to thereby dissolve the sample. Thereafter, a Ubbelohde's capillary viscometer was used to measure at 30° C. the relative viscosity (ηrel) of the solution, i.e., the viscosity relative to that of the original liquid. Furthermore, the specific viscosity (ηsp) was determined from the relative viscosity, i.e., [relative viscosity (ηrel)]−1, and the ratio (ηsp/c) between the specific viscosity (ηsp) and the concentration (c) was determined. Likewise, solutions having concentrations (c) regulated to 0.5 g/dL, 0.2 g/dL, and 0.1 g/dL were examined to determine the respective ratios (ηsp/c). The concentration (c) was extrapolated to 0 and the ratio (ηsp/c) in this case was determined as intrinsic viscosity [η] (dL/g) from those values.

<Color Tone>

Polyester chips obtained through polycondensation reactions were packed into a cylindrical cell for powder examination having an inner diameter of 30 mm and a depth of 12 mm. Colorimetric color-difference meter ZE-2000 (manufactured by Nippon Denshoku Industries Co., Ltd.) was used to determine the value of color b in the chromaticity coordinates in Hunter's color difference formula according to the Lab color system as provided for in Reference Example 1 in JIS Z8730, by the reflection method. This measurement was made on four points, while rotating the examination cell by 900 at a time. The simple average of these four values was taken as the color tone.

<Amount of Terminal Carboxyl Groups>

Polyester chips were pulverized, subsequently dried with a hot-air drying oven at 140° C. for 15 minutes, and then cooled to room temperature in a desiccator. A 0.1-g portion of this sample was precisely weighed out and placed in a test tube, and 3 mL of benzyl alcohol was added thereto. The sample was dissolved in the alcohol at 195° C. for 3 minutes while bubbling dry nitrogen gas thereinto. Subsequently, 5 mL of chloroform was gradually added to the solution, which was cooled to room temperature. One or two drops of Phenol Red indicator were added to the solution, and this solution was titrated with a 0.1-N benzyl alcohol solution of sodium hydroxide with stirring while bubbling dry nitrogen gas thereinto. At the time when the color of the solution changed from yellow to red, the titration was terminated. On the other hand, the same operation as the above one except that the polyester resin sample was not used was conducted as a blank. The acid value was calculated using the following equation (3).

$$\text{Acid value} = (\text{mol/ton}) = (A-B) \times 0.1 \times f/W \quad (3)$$

[In equation (3), symbol A is the amount (μL) of the 0.1-N benzyl alcohol solution of sodium hydroxide used for the titration; B is the amount (μL) of the 0.1-N benzyl alcohol solution of sodium hydroxide used for the titration of the blank; W is the amount (g) of the polyester resin sample; and f is the titer of the 0.1-N benzyl alcohol solution of sodium hydroxide.]

Incidentally, the titer (f) of the 0.1-N benzyl alcohol solution of sodium hydroxide was determined by the following method. Five milliliters of methanol was placed in a test tube, and one or two drops of an ethanol solution of Phenol Red were added thereto as an indicator. This methanol was titrated to a color change point with 0.4 mL of the 0.1-N benzyl alcohol solution of sodium hydroxide. Subsequently, 0.2 mL of 0.1-N aqueous hydrochloric acid solution having a known titer was added as a standard solution to the methanol. This methanol was titrated again with the 0.1-N benzyl alcohol solution of sodium hydroxide to the color change point (these operations were conducted with the bubbling of dry nitrogen gas). The titer (f) was calculated using the following equation (4).

Titer$(f)$=[titer of the 0.1-N aqueous hydrochloric acid solution]×[amount of the 0.1-N aqueous hydrochloric acid solution added(μL)]/[amount of the 0.1-N benzyl alcohol solution of sodium hydroxide used for titration(μL)] (4)

<Content of Diethylene Glycol Units>

Polyester chips were dissolved in deuterized trifluoroacetic acid at ordinary temperature to obtain a 3% by weight solution. Nuclear magnetic resonance apparatus JNM-EX270, manufactured by JEOL Ltd., was used to obtain a 1H-NMR spectrum using trimethylsilyl chloride (TMS) as a reference. Each peak was assigned. Peaks attributable to diol ingredients were extracted from the peaks assigned, and the amount of diethylene glycol (% by mole) in the diol ingredients was calculated from integral proportions thereof.

<Cyclic-Trimer (CT) Content>

Polyester chips which had undergone solid-phase polycondensation were freeze-pulverized. Thereafter, 200 mg of the resultant resin sample was precisely weighed out and dissolved in 2 mL of a chloroform/hexafluoroisopropanol (3/2 by volume) mixture solution. The resultant solution was diluted with 20 mL of chloroform. Ten milliliters of methanol was added thereto to precipitate the sample. Subsequently, this mixture was filtered to obtain a filtrate. This filtrate was evaporated to dryness, and the residue was dissolved in 25 mL of dimethylformamide. The amount of a cyclic trimer (cyclotriene terephthalate) in this solution was determined with liquid chromatograph Type LC-10A, manufactured by Shimadzu Corp., and expressed in weight ppm of the resin.

In case where a resin contains the cyclic trimer in a large amount, molding of this resin causes mold fouling due to adhesion of the cyclic trimer to the mold and satisfactory molded articles are less apt to be obtained.

<Rate of Polycondensation Reaction>

The rate of melt polycondensation Km is determined using the following equation (5).

$Km = \ln(Mn'/Mn)/[\text{period(min)}] \times 10^2$ (5)

In equation (5), Mn' is the number-average molecular weight of the polyester obtained through melt polycondensation reaction, the molecular weight being calculated from the intrinsic viscosity [η] (dL/g) of the polyester; Mn is the number-average molecular weight of the oligomer to be subjected to polycondensation reaction, the molecular weight being calculated from the intrinsic viscosity of the oligomer; and the period (min) is the time period of polycondensation reaction from initiation of pressure reduction.

Likewise, the rate of solid-phase polycondensation Ks is determined using the following equation (6).

$Ks = \ln(Mn''/Mn')/[\text{period(min)}] \times 10^4$ (6)

In equation (6), Mn" is the number-average molecular weight of the polyester obtained through solid-phase polycondensation reaction, the molecular weight being calculated from the intrinsic viscosity [η] (dL/g) of the polyester.

The molecular weights Mn and Mn' are determined using the following equation (7).

Molecular weight(Mn or Mn')=(intrinsic viscosity[η]/0.00021)(1/0.82) (7)

Example 1

Production of Liquid Polycondensation Catalyst for Polyester Production

Into a 1-L eggplant type flask made of glass and equipped with a stirrer were introduced 500 g of ethylene glycol, 23.3 g of magnesium acetate tetrahydrate, and 11.9 g of ethyl acid phosphate (trade name, JP-502; manufactured by Johoku Chemical Co., Ltd.; monoester/diester weigh ratio, 0.82:1) (M/P (molar ratio)=1.3). The contents were mixed/stirred at ordinary pressure and room temperature (23° C.) and a homogeneous transparent solution was obtained after 10 minutes. Subsequently, 12.5 g of tetra-n-butyl titanate was added over 2 minutes (Ti/P (molar ratio)=0.43; titanium content, 0.3% by weight), and the resultant mixture was further stirred. The mixture opacified immediately after the addition of tetra-n-butyl titanate. However, at 5 minutes after the addition, a homogeneous and transparent catalyst solution for polycondensation for polyester production was obtained. The catalyst solution obtained was transferred to sample bottles. This catalyst solution in the bottles in a tightly sealed state were stored in a refrigerator (5° C.), at room temperature (23-25° C.), and in a thermostatic chamber (50-60° C.) and the state thereof was examined. The catalyst solution retained homogeneity and transparency over 3 months under any of those conditions.

The liquid polycondensation catalyst for polyester production obtained above had a pH of 5.5 and a water content of 1.4% by weight.

Example 2

Production of Liquid Polycondensation Catalyst for Polyester Production)

A catalyst solution (M/P (molar ratio)=1.3; Ti/P (molar ratio)=0.43; titanium content, 0.3% by weight) was obtained by conducting the same operation as in Example 1, except that 17.9 g of dibutyl acid phosphate (manufactured by Tokyo Kasei Co., Ltd.) was used in place of the ethyl acid phosphate.

The catalyst solution obtained was transferred to sample bottles. This catalyst solution were stored in a refrigerator (5° C.), at room temperature (23-25° C.), and in a thermostatic chamber (50-60° C.) and the state thereof was examined. The catalyst solution retained homogeneity and transparency over months under any of those conditions.

The liquid polycondensation catalyst for polyester production obtained above had a pH of 5.5 and a water content of 1.4% by weight.

Example 3

Production of Liquid Polycondensation Catalyst for Polyester Production

A catalyst solution (Ti/P (molar ratio)=1.1; titanium content, 0.3% by weight) was obtained in the same manner as in Example 1, except that the amount of the ethyl acid phosphate to be used was changed to 4.8 g (Mg/P (molar ratio)=3.2). The catalyst solution obtained was transferred to sample bottles and allowed to stand at room temperature (23-25° C.) for 1 month. As a result, a precipitate generated slightly.

The liquid polycondensation catalyst for polyester production obtained above had a pH of 5.9 and a water content of 1.4% by weight.

Comparative Example 1

Production of Catalyst

A catalyst was produced by mixing a titanium compound, a magnesium compound, and an acid phosphoric ester compound in the same order as that described in JP-A-2004-224858 (patent document 2).

Namely, a catalyst was produced in the following manner. Into a 1-L eggplant type flask made of glass and equipped with a stirrer was introduced 500 g of ethylene glycol. Therein was suspended 23.3 g of magnesium acetate tetrahydrate. Subsequently, 12.5 g of tetra-n-butyl titanate was added thereto, and the contents were mixed/stirred at room temperature (23° C.) At 60 minutes thereafter, a large amount of white suspended slurry was observed. Subsequently, 11.9 g of ethyl acid phosphate was added (M/P (molar ratio)=1.3; Ti/P (molar ratio)=0.43; titanium content, 0.3% by weight), and the resultant mixture was continuously stirred for a whole day and night. However, the slurry remained undissolved. After several days, the slurry had completely separated into a white precipitate and a transparent solvent. The precipitate was taken out by filtration, vacuum-dried, subsequently wet-decomposed with sulfuric acid and hydrogen peroxide, and then subjected to ICP metal analysis with an ICP-AES apparatus (Type JY-138U, manufactured by JOBIN YVON). As a result, the precipitate was found to mainly contain titanium and magnesium.

Comparative Example 2

Production of Catalyst

Into a 1-L eggplant type flask made of glass and equipped with a stirrer was introduced 500 g of ethylene glycol. Thereto were almost simultaneously added 23.3 g of magnesium acetate tetrahydrate, 11.9 g of the ethyl acid phosphate, and 12.5 g of tetra-n-butyl titanate (M/P (molar ratio)=1.3; Ti/P (molar ratio)=0.43; titanium content, 0.3% by weight). The contents were mixed/stirred at room temperature (23° C.). At 60 minutes thereafter, the contents opacified. After several days, a large amount of a precipitate was observed. The precipitate was subjected to ICP metal analysis in the same manner as in Comparative Example 1. As a result, the precipitate was found to mainly contain titanium and magnesium.

Comparative Example 3

Production of Catalyst

Into a 1-L eggplant type flask made of glass and equipped with a stirrer was introduced 500 g of ethylene glycol, followed by 11.9 g of the ethyl acid phosphate. To the resultant homogeneous solution was added 12.5 g of tetra-n-butyl titanate. Thereafter, the contents were further mixed/stirred at room temperature (23° C.). At 60 minutes thereafter, a large amount of a white precipitate was observed. Subsequently, 23.3 g of magnesium acetate tetrahydrate was added, but a homogeneous solution was not obtained (M/P (molar ratio)=1.3; Ti/P (molar ratio)=0.43; titanium content, 0.3% by weight). The precipitate was subjected to ICP metal analysis in the same manner as in Comparative Example 1. As a result, the precipitate was found to mainly contain titanium and phosphorus. Furthermore, the precipitate yielded was found to have yellowed at 30 days thereafter.

Comparative Example 4

Production of Catalyst

Into a 1-L eggplant type flask made of glass and equipped with a stirrer were introduced 500 g of ethylene glycol and 23.3 g of magnesium acetate tetrahydrate. The contents were mixed/stirred. After 30 minutes, a homogeneous transparent liquid was obtained. Subsequently, 11.9 g of the ethyl acid phosphate and 12.5 g of tetra-n-butyl titanate were simultaneous added thereto (M/P (molar ratio)=1.3; Ti/P (molar ratio)=0.43; titanium content, 0.3% by weight). The contents were further mixed/stirred at room temperature (23° C.). At 60 minutes thereafter, an opacified state was observed. Subsequently, this catalyst liquid was heated with refluxing for 5 hours at an oil bath temperature of 100° C. However, the opacified state did not disappear at all. The liquid was allowed to stand for 1 day and, as a result, a white precipitate was observed. This precipitate was subjected to ICP metal analysis in the same manner as in Comparative Example 1. As a result, the precipitate was found to contain titanium, magnesium, and phosphorus.

Comparative Example 5

Production of Catalyst

Into a three-neck flask having a capacity of 2 L and equipped with a stirrer were introduced 919 g of ethylene glycol and 80 g of trimellitic anhydride. The contents were mixed/stirred. Thereto was added 71 g of tetra-n-butyl titanate over 5 minutes. Thus, a transparent ethylene glycol solution containing a titanium compound was obtained (this is referred to as solution A).

Into another three-neck flask having a capacity of 2 L and equipped with a stirrer were introduced 400 g of ethylene glycol and 28.3 g of magnesium acetate tetrahydrate. The contents were heated to 100° C. with stirring on an oil bath to obtain a homogeneous solution (this is referred to as solution B).

Into still another three-neck flask having a capacity of 2 L and equipped with a stirrer was introduced 272 g of ethyleneglycol. The contents were heated to 160° C. with stirring. At the time when the temperature thereof reached 160° C., 18.2 g of trimethyl phosphate was added thereto. The contents were mixed/stirred with heating to dissolve the phosphate. Thus, a transparent solution was obtained (this is referred to as solution C).

A 310-g portion of solution A prepared first was added over 5 minutes to solution B kept at 100° C. with stirring. The resultant mixture was held at a temperature of 100° C. with stirring for 1 hour. Thus, a solution of a titanium compound/magnesium compound mixture was produced. Furthermore, all of solution C was added thereto, and the resultant mixture was held at a temperature of 100° C. with stirring for 1 hour.

The catalyst solution thus prepared (M/P (molar ratio)=1.0; Ti/P (molar ratio)=0.5; titanium content, 0.3% by weight) was cooled to room temperature and evaluated for storability. As a result, the solution, which was transparent for several hours after the cooling, was clearly in an opacified state at 1 day thereafter. After 1 week, a large amount of a precipitate was observed.

The catalyst production processes in Examples 1 to and Comparative Examples 1 to 5 and the results concerning the catalysts obtained are summarized in Table 7.

TABLE 7

| | Catalyst Production Process | | | Mg/P (molar ratio) | State just after production | State after 30 days |
|---|---|---|---|---|---|---|
| Example 1 | | TBT ↓ | | 1.3 | homogeneous transparent solution | homogeneous transparent solution |
| | EAP + MGO | → | ethylene glycol solution containing Ti, Mg, and P | | | |
| Example 2 | | TBT ↓ | | 1.3 | homogeneous transparent solution | homogeneous transparent solution |
| | DBAP + MGO | → | ethylene glycol solution containing Ti, Mg, and P | | | |
| Example 3 | | TBT ↓ | | 3.2 | homogeneous transparent solution | slight precipitate |
| | EAP + MGO | → | ethylene glycol solution containing Ti, Mg, and P | | | |
| Comparative Example 1 | | EAP ↓ | | 1.3 | homogeneous slurry | considerable precipitate |
| | TBT + MGO | → | ethylene glycol solution containing precipitate | | | |
| Comparative Example 2 | | | | 1.3 | homogeneous slurry | considerable precipitate |
| | TBT + MGO + EAP | → | ethylene glycol solution containing precipitate | | | |
| Comparative Example 3 | | MGO ↓ | | 1.3 | considerable precipitate | considerable precipitate (yellowing) |
| | EAP + TBT | → | ethylene glycol solution containing precipitate | | | |
| Comparative Example 4 | TBT, EAP ↓ MGO | refluxing at 100° C. → 5 hr | ethylene glycol solution containing opacifying matter | 1.3 | homogeneous slurry | considerable precipitate |
| Comparative Example 5 | | TMP ↓ | | 1.0 | homogeneous transparent solution | considerable precipitate |
| | MGO + TBT' | → 100° C. | ethylene glycol solution containing Ti, Mg, and P | | | |

TBT: tetra-n-butyl titanate
MGO: magnesium acetate tetrahydrate
TBT': tetra-n-butyl titanate treated with trimellitic anhydride
TMP: trimethyl phosphate
BAP: butyl acid phosphate
DBAP: dibutyl acid phosphate
EAP: ethyl acid phosphate (monoester/diester mixture JP502, manufactured by Johoku Chemical Co., Ltd.)

Example 4

Production of Polyester

The homogeneous liquid polycondensation catalyst for polyester production obtained in Example 1, which contained titanium, magnesium, and phosphorus, was used to conduct polycondensation reactions.

(Production of Raw-Material Oligomer)

To an esterification reaction vessel were fed 2,012 kg (10.4×10$^3$ mol) of dimethyl terephthalate and 1,286 kg (20.7× 10$^3$) of ethylene glycol. After dissolution, calcium acetate dissolved in ethylene glycol was added thereto in an amount of 0.20 kg in terms of calcium atom amount (100 ppm of the product to be obtained by transesterification reaction). A transesterification reaction was conducted while keeping the reaction mixture at 220° C. and distilling off the methanol generated. After completion of the transesterification reaction, a slurry obtained by stirring/mixing 1,721 kg (10.4×10$^3$) of terephthalic acid and 772 kg (12.4×10$^3$ mol) of ethylene glycol in a slurrying vessel was continuously fed to the esterification reaction vessel over 3 hours. An esterification reaction was conducted at ordinary pressure and about 250° C. At about 4 hours after initiation of the transfer, about 50% of the liquid reaction mixture was discharged and sent to a polycondensation reaction vessel.

A slurry composed of terephthalic acid and ethylene glycol and obtained in the same manner as described above was fed to that esterification reaction vessel to conduct an esterification reaction. The step of transferring about 50% of the liquid reaction mixture to the polycondensation reaction vessel was repeated ten times in total to thereby reduce the concentration of calcium acetate in the liquid esterification reaction mixture to 0.5 ppm or lower.

Thus, a terephthalic acid/ethylene glycol esterification product (oligomer) containing substantially no transesterification reaction catalyst ingredient was produced. This esterification product was discharged in the course of transfer from the esterification reaction vessel to the polycondensation reaction vessel and cooled/solidified in the air to thereby obtain a raw-material oligomer to be used in the following Example. This raw-material oligomer had a degree of esterification of 96%.

In producing the raw-material oligomer, the molar ratio of the ethylene glycol to the terephthalic acid finally became 1.2. The raw-material oligomer obtained had a number-average molecular weight (Mn) of 2,280.

(Polycondensation Reactions)

To a polycondensation reactor equipped with a stirrer having a torque meter was transferred 104 g of the raw-material oligomer. After the atmosphere in the system was replaced with nitrogen, the oligomer was melted on an oil bath (kept at 260° C.). In the following, each time is expressed in terms of the lapse of time from initiation of the oligomer-dissolving operation.

At 60 minutes after, the oligomer was ascertained to have been completely melted. Subsequently, stirring at 50 rpm was initiated. At 70 minutes after, 3 mL of a solution prepared by diluting the liquid polycondensation catalyst for polyester production prepared in Example 1 with ethylene glycol 26-fold was added to the melt. The contents of titanium, magnesium, and phosphorus in the polyester resin to be obtained would be 4, 6, and 6 ppm by weight, respectively. At 80 minutes after, evacuation was initiated. At 140 minutes after, the internal pressure decreased to $2.7 \times 10^{-4}$ MPa. This evacuation operation was conducted in such a manner that the logarithm of pressure was inversely proportional to time. This melt polycondensation reaction was conducted in such a manner that the polycondensation temperature increased from 260° C. to 280° C. at a constant rate throughout the period from the time at 80 minutes after to the time at 160 minutes after, and that the final intrinsic viscosity was in the range of 0.50-0.60 (dL/g). The time at which the evacuation was initiated was taken as a polycondensation initiation time.

After completion of the melt polycondensation (melt polycondensation time, 163 minutes), the stirring was stopped and the pressure was returned to ordinary pressure with nitrogen. The polycondensation reactor was taken out of the oil bath. Immediately after the polycondensation reactor had been taken out of the oil bath, the discharge opening of the reactor was opened and the polyester was discharged by slightly pressurizing the inside of the system with nitrogen. This polyester was cooled with water and solidified. Thus, a polyester in a strand form was obtained. The polyester obtained was cut into chips of about 0.02 (g/granule). The polyester resin obtained had an intrinsic viscosity of 0.520 dL/g and a color b value of 7.0.

Two grams of the chip-form polyester resin obtained was spread in an aluminum foil cup (bottom diameter, 4.5 cm; top-part diameter, 7.0 cm; depth, 5.0 cm) in such a manner that the chips did not overlap one another. This cup was placed at a central part in an inert oven (I/O DN4101, manufactured by Yamato Scientific Co., Ltd.) having a set internal temperature of 60° C. In a 30 L/h nitrogen stream, the polyester resin was heated from 60° C. to 160° C. over 30 minutes and dried and crystallized at 160° C. for 2 hours. Thereafter, the resin was heated to 210° C. over 30 minutes and caused to undergo solid-phase polycondensation at 210° C. for 10 hours. After completion of the solid-phase polycondensation, the chips were cooled to 60° C. over 30 minutes and then recovered.

Comparative Example 6

Production of Polyester

Polycondensation reactions were conducted in the same manner as in Example 4, except that the ethylene glycol slurry obtained in Comparative Example 1, which contained a white precipitate mainly containing titanium and magnesium and ethyl acid phosphate, was used in place of the liquid polycondensation catalyst in Example 4. Through a melt polycondensation time of 340 minutes, a polyester resin having an intrinsic viscosity of 0.558 dL/g and a color b value of 8.6 was obtained.

Solid-phase polycondensation was conducted for 10 hours in the same manner as in Example 4.

The results of the polymerization in Example 4 and Comparative Example 6 are summarized in Table 8.

TABLE 8

| | | Melt polycondensation | | | | | | Solid-phase polycondensation (10 hr) | | |
|---|---|---|---|---|---|---|---|---|---|---|
| | Polycondensation catalyst | Polymerization time min | Intrinsic viscosity dL/g | Polymerization rate Km, min$^{-1}$ | AV eq/ton | b | DEG mol % | Intrinsic viscosity dL/g | CT ppm | Polymerization rate Ks, min$^{-1}$ |
| Example 4 | Example 1 | 163 | 0.520 | 1.1 | 11.6 | 7.0 | 1.45 | 0.652 | 3800 | 4.6 |
| Comparative Example 6 | Comparative Example 1 | 340 | 0.558 | 0/6 | 12.3 | 8.6 | 1.83 | 0.671 | 4600 | 3.7 |

DEG: diethylene glycol copolymerized
CT: cyclic trimer
AV: terminal carboxyl group amount The following can be clearly seen from the results given in Table 8. The homogeneous liquid polycondensation catalyst for polyester production obtained by the process of the invention, which contains titanium, magnesium, and phosphorus, has excellent polycondensation activity. The polyester obtained through melt polycondensation using this catalyst is satisfactory especially in color tone. Furthermore, the polyester obtained through solid-phase polycondensation has excellent quality, e.g., a low cyclic-trimer proportion.

While the invention has been described in detail and with reference to specific embodiments thereof, it will be apparent to one skilled in the art that various changes and modifications can be made therein without departing from the spirit and scope thereof.

This application is based on a Japanese patent application filed on Jan. 21, 2005 (Application No. 2005-014379), a Japanese patent application filed on May 13, 2005 (Application No. 2005-141470), and a Japanese patent application filed on Nov. 1, 2005 (Application No. 2005-318546), the contents thereof being herein incorporated by reference.

INDUSTRIAL APPLICABILITY

According to the invention, a solid or liquid polycondensation catalyst for polyester production is provided which contains none of compounds of antimony, germanium, or the like, contains titanium atoms, alkaline earth metal atoms, and phosphorus atoms, contains catalytically active ingredients in high concentrations, has excellent long-term storage stability, can be easily produced industrially, and has an advantage in cost. With this polycondensation catalyst for polyester production, a polyester resin excellent in quality, e.g., color tone, can be industrially advantageously produced.

Furthermore, according to the invention, the problem concerning portion-wise addition in polyester production employing a titanium compound, an alkaline earth metal compound, and a phosphorus compound can be eliminated. The liquid polycondensation catalyst for polyester production of the invention is free from problems such as, e.g., the precipitation of a catalyst component during long-term storage, has excellent long-term storage stability and excellent reactivity, and can provide a polyester resin excellent in quality, e.g., color tone.

The invention claimed is:

1. A liquid catalyst solution comprising:
   ethylene glycol and/or 1,4-butanediol; and
   a polycondensation catalyst comprising one or more titanium atoms, one or more alkaline earth metal atoms, one or more phosphorus atoms, and one or more carbon atoms, said polycondensation catalyst obtained by a process comprising
   forming a mixture comprising at least one monohydric alcohol, at least one titanium compound, at least one alkaline earth metal compound and at least one acid phosphoric ester compound, and
   concentrating the mixture,
   wherein
   at least part of the carbon atoms are derived from an aliphatic carboxylic acid and/or an aliphatic carboxylate which is derived from an aliphatic carboxylic acid salt of the one or more alkaline earth metal atoms,
   the content of the titanium atoms T is 4-20% by weight of the polycondensation catalyst,
   the molar content of the aliphatic carboxylic acid and/or the aliphatic carboxylate (L), the molar content of the alkaline earth metal atoms (M), the weight content of the titanium atoms (T), the molar content of the phosphorus atoms (P), and the weight content of the carbon atoms (C) satisfy expressions (1), (2) and (3):

$$0.8 \leq L/M \leq 1.8 \quad (1)$$

$$0.05 \leq T/C \leq 0.50 \quad (2)$$

$$0.5 \leq M/P \leq 3.0 \quad (3); \text{ and}$$

with the proviso that the at least one titanium compound has not been previously treated with an aromatic polycarboxylic acid, and wherein, when the polycondensation catalyst is dissolved in ethylene glycol, the titanium atoms are present in a concentration of 10,000 ppm to 100,000 ppm.

2. The liquid catalyst solution of claim 1, wherein said solution has a water content of 0.01-10% by weight.

3. The liquid catalyst solution of claim 1, which is obtained by:
   forming a mixture comprising ethylene glycol and/or 1,4-butanediol, and a liquid material comprising the polycondensation catalyst;
   concentrating the mixture; and
   distilling off substances in the concentrated mixture which have a lower boiling point than the ethylene glycol and/or 1,4-butanediol.

4. The liquid catalyst solution of claim 1, wherein a ratio $(W_1/W_0)$ of the weight of the polycondensation catalyst $(W_1)$ to the total weight of the mixture of the at least one titanium compound, the at least one alkaline earth metal compound and the at least one acid phosphoric ester compound $(W_0)$ is from 0.45 to 0.85.

5. The liquid catalyst solution of claim 1, wherein the polycondensation catalyst comprises a structure represented by formula (III)

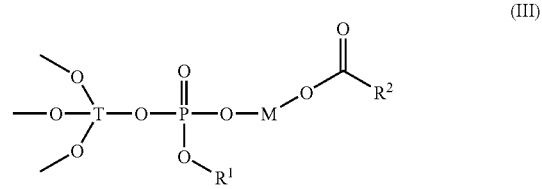

(III)

wherein

T is a titanium atom;

M is an alkaline earth metal atom;

O is an oxygen atom;

P is a phosphorus atom;

$R^1$ is an alkyl group having 1-6 carbon atoms, a cyclohexyl group, an aryl group, or a 2-hydroxyethyl group; and $R^2$ is an alkyl group having 1-3 carbon atoms.

6. The liquid catalyst solution of claim 1, wherein the polycondensation catalyst is a solid.

7. The liquid catalyst solution according to claim 1, wherein the monohydric alcohol is ethanol.

* * * * *